US012652709B2

(12) United States Patent
Cho et al.

(10) Patent No.: US 12,652,709 B2
(45) Date of Patent: Jun. 9, 2026

(54) ELECTRONIC DEVICE AND METHOD FOR PROVIDING EXERCISE DATA BY ELECTRONIC DEVICE

(71) Applicant: Samsung Electronics Co., Ltd., Suwon-si (KR)

(72) Inventors: Daesung Cho, Suwon-si (KR); Jihae Ko, Suwon-si (KR); Sangmi Kim, Suwon-si (KR); Boram Bae, Suwon-si (KR); Taehwan Son, Suwon-si (KR); Seongmin Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 18/432,885

(22) Filed: Feb. 5, 2024

(65) Prior Publication Data

US 2024/0179763 A1 May 30, 2024

Related U.S. Application Data

(63) Continuation of application No. PCT/KR2022/011778, filed on Aug. 8, 2022.

(30) Foreign Application Priority Data

Aug. 10, 2021 (KR) ........................ 10-2021-0105397

(51) Int. Cl.
*H04W 76/10* (2018.01)
*A63B 24/00* (2006.01)
(Continued)

(52) U.S. Cl.
CPC ......... *H04W 76/10* (2018.02); *A63B 24/0062* (2013.01); *A63B 71/0622* (2013.01);
(Continued)

(58) Field of Classification Search
CPC . H04W 52/367; H04W 52/365; H04W 52/42; H04W 52/36; H04B 7/06956; H04L 5/0053; Y02D 30/70
See application file for complete search history.

(56) References Cited

U.S. PATENT DOCUMENTS 10,814,167 B2 10/2020 Blahnik et al.
11,033,776 B2 * 6/2021 Vermilyea ............. A63F 13/213
(Continued)

FOREIGN PATENT DOCUMENTS

CN 112755458 A 5/2021
JP 6325384 B2 5/2018
(Continued)

OTHER PUBLICATIONS

International Search Report with Written Opinion dated Nov. 16, 2022; International Appln. No. PCT/KR2022/011778.
(Continued)

*Primary Examiner* — Dominic E Rego
(74) *Attorney, Agent, or Firm* — Jefferson IP Law, LLP

(57) ABSTRACT

An electronic device is provided. The electronic device includes a display, at least one sensor, a communication circuit, one or more processors, and memory. The memory store one or more computer programs including computer-executable instructions that, when executed by the one or more processors, cause the electronic device to obtain first exercise data on the basis of a value measured by means of the at least one sensor, in a first operation mode, generate and store first exercise summary data on the basis of the first exercise data, communication-connect to a first external electronic device by means of the communication circuit, if a predefined data type is received from the first external electronic device, switch to a second operation mode, receive a data transmission command from the first external electronic device by means of the communication circuit, (Continued)

when the data transmission command is received, obtain second exercise data corresponding to content displayed on a second external electronic device, on the basis of a value measured by means of the at least one sensor, transmit second exercise data to the first external electronic device in real time for a predetermined time by means of the communication circuit, and receive and store second exercise summary data generated on the basis of the second exercise data, from the second external electronic device.

20 Claims, 17 Drawing Sheets

(51) Int. Cl.

| | | |
|---|---|---|
| *A63B 71/06* | (2006.01) | |
| *G06F 3/01* | (2006.01) | |
| *H04L 65/1069* | (2022.01) | |
| *H04L 65/65* | (2022.01) | |

(52) U.S. Cl.
CPC .......... *G06F 3/011* (2013.01); *H04L 65/1069* (2013.01); *H04L 65/65* (2022.05); *A63B 2225/20* (2013.01)

(56) References Cited

U.S. PATENT DOCUMENTS

| | | | | |
|---|---|---|---|---|
| 11,179,601 | B2 * | 11/2021 | Wiebe | ................. G09B 19/003 |
| 11,291,388 | B2 * | 4/2022 | Yamamoto | ........... A61B 5/1121 |
| 2014/0135960 | A1 | 5/2014 | Choi | |
| 2015/0375081 | A1 * | 12/2015 | Ito | ........................... G09B 5/02 |
| | | | | 473/223 |
| 2016/0004224 | A1 | 1/2016 | Pi | |
| 2016/0360336 | A1 | 12/2016 | Gross et al. | |
| 2017/0011210 | A1 | 1/2017 | Cheong et al. | |
| 2017/0144042 | A1 | 5/2017 | Kanda | |
| 2018/0140900 | A1 | 5/2018 | Kim et al. | |
| 2018/0180436 | A1 * | 6/2018 | Shibata | ................ G01C 21/367 |
| 2018/0181633 | A1 * | 6/2018 | Imamura | ............ G06F 3/04883 |
| 2018/0333612 | A1 * | 11/2018 | Davis | ..................... G08C 17/02 |
| 2018/0345077 | A1 | 12/2018 | Blahnik et al. | |
| 2019/0184234 | A1 * | 6/2019 | Packles | ............. A63B 24/0062 |
| 2021/0060384 | A1 | 3/2021 | Choi et al. | |
| 2022/0005580 | A1 | 1/2022 | Pavlov et al. | |

FOREIGN PATENT DOCUMENTS

| | | | |
|---|---|---|---|
| JP | 2019-057290 A | 4/2019 | |
| KR | 10-2014-0062892 A | 5/2014 | |
| KR | 10-1471853 B1 | 12/2014 | |
| KR | 10-2015-0112234 A | 10/2015 | |
| KR | 10-2016-0066076 A | 6/2016 | |
| KR | 10-1849761 B1 | 5/2018 | |
| KR | 10-2019-0026319 A | 3/2019 | |
| KR | 10-2019-0034568 A | 4/2019 | |
| KR | 10-2020-0066204 A | 6/2020 | |
| KR | 10-2245338 B1 | 4/2021 | |
| KR | 10-2317909 B1 | 10/2021 | |
| KR | 10-2405508 B1 | 6/2022 | |

OTHER PUBLICATIONS

Extended European Search Report dated Sep. 24, 2024; European Appln. No. 22856145.2-1122 / 4369351 PCT/KR2022011778.

* cited by examiner

FIG. 2
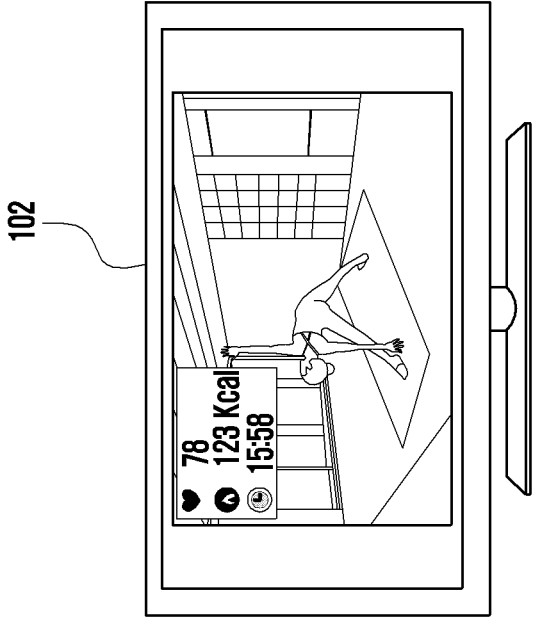
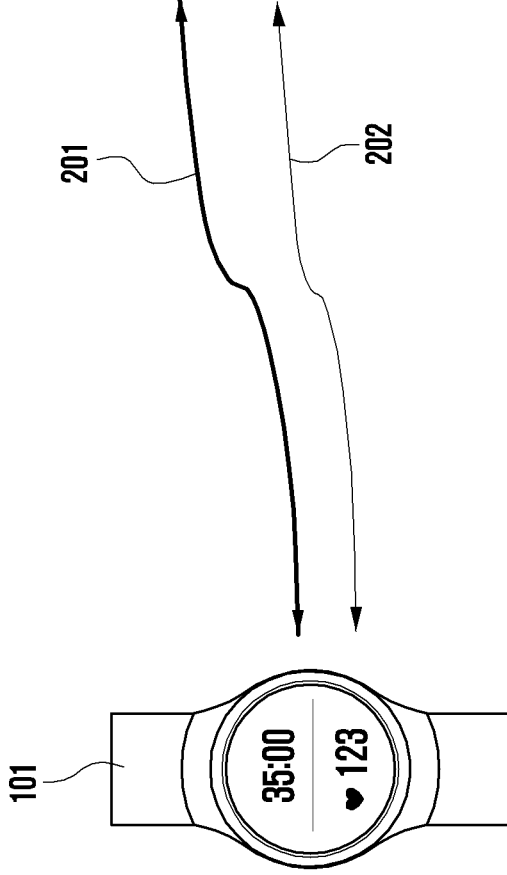

FIG. 7

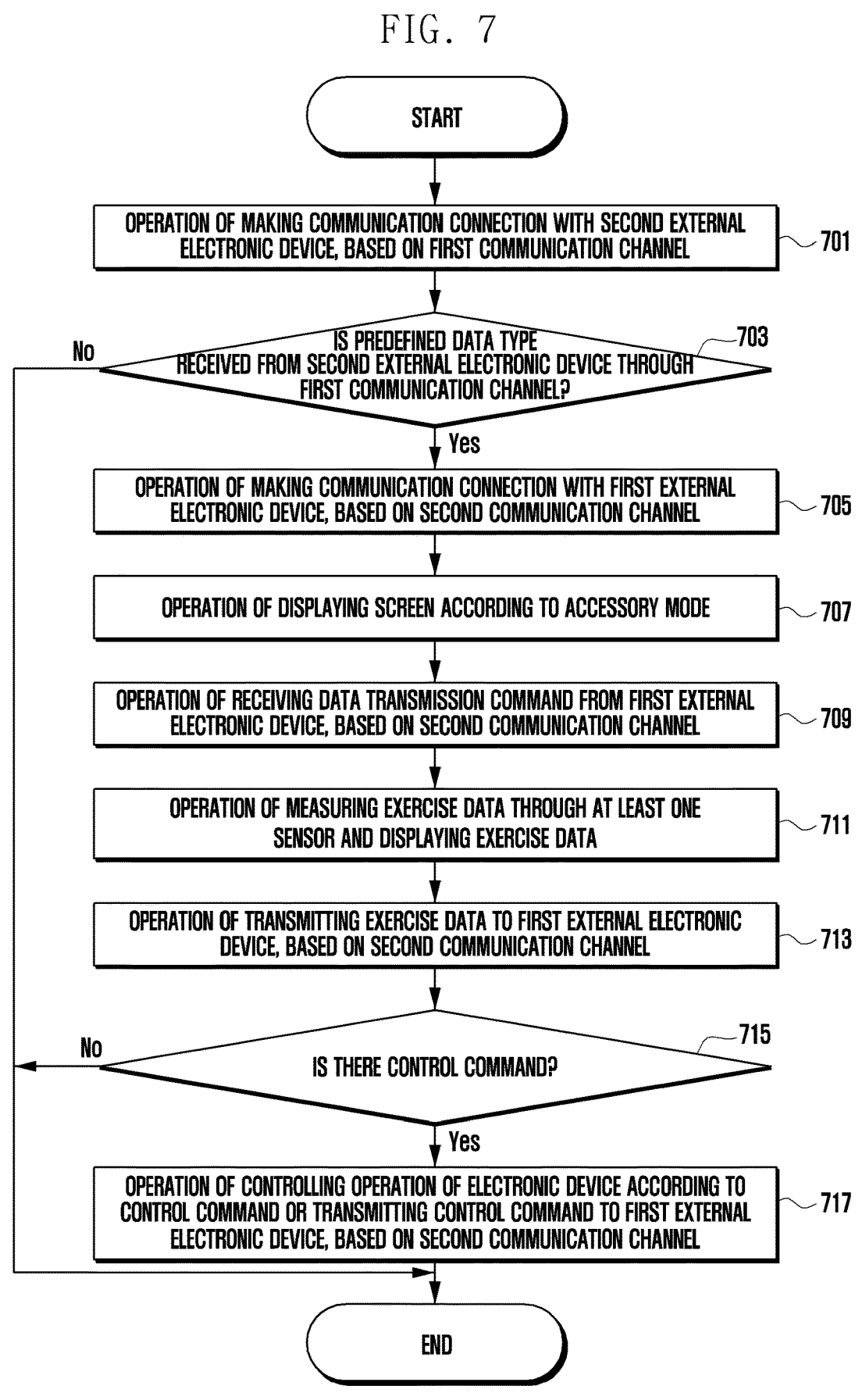

START

OPERATION OF MAKING COMMUNICATION CONNECTION WITH SECOND EXTERNAL ELECTRONIC DEVICE, BASED ON FIRST COMMUNICATION CHANNEL ~701

IS PREDEFINED DATA TYPE RECEIVED FROM SECOND EXTERNAL ELECTRONIC DEVICE THROUGH FIRST COMMUNICATION CHANNEL? ~703

No

Yes

OPERATION OF MAKING COMMUNICATION CONNECTION WITH FIRST EXTERNAL ELECTRONIC DEVICE, BASED ON SECOND COMMUNICATION CHANNEL ~705

OPERATION OF DISPLAYING SCREEN ACCORDING TO ACCESSORY MODE ~707

OPERATION OF RECEIVING DATA TRANSMISSION COMMAND FROM FIRST EXTERNAL ELECTRONIC DEVICE, BASED ON SECOND COMMUNICATION CHANNEL ~709

OPERATION OF MEASURING EXERCISE DATA THROUGH AT LEAST ONE SENSOR AND DISPLAYING EXERCISE DATA ~711

OPERATION OF TRANSMITTING EXERCISE DATA TO FIRST EXTERNAL ELECTRONIC DEVICE, BASED ON SECOND COMMUNICATION CHANNEL ~713

IS THERE CONTROL COMMAND? ~715

No

Yes

OPERATION OF CONTROLLING OPERATION OF ELECTRONIC DEVICE ACCORDING TO CONTROL COMMAND OR TRANSMITTING CONTROL COMMAND TO FIRST EXTERNAL ELECTRONIC DEVICE, BASED ON SECOND COMMUNICATION CHANNEL ~717

END

FIG. 9

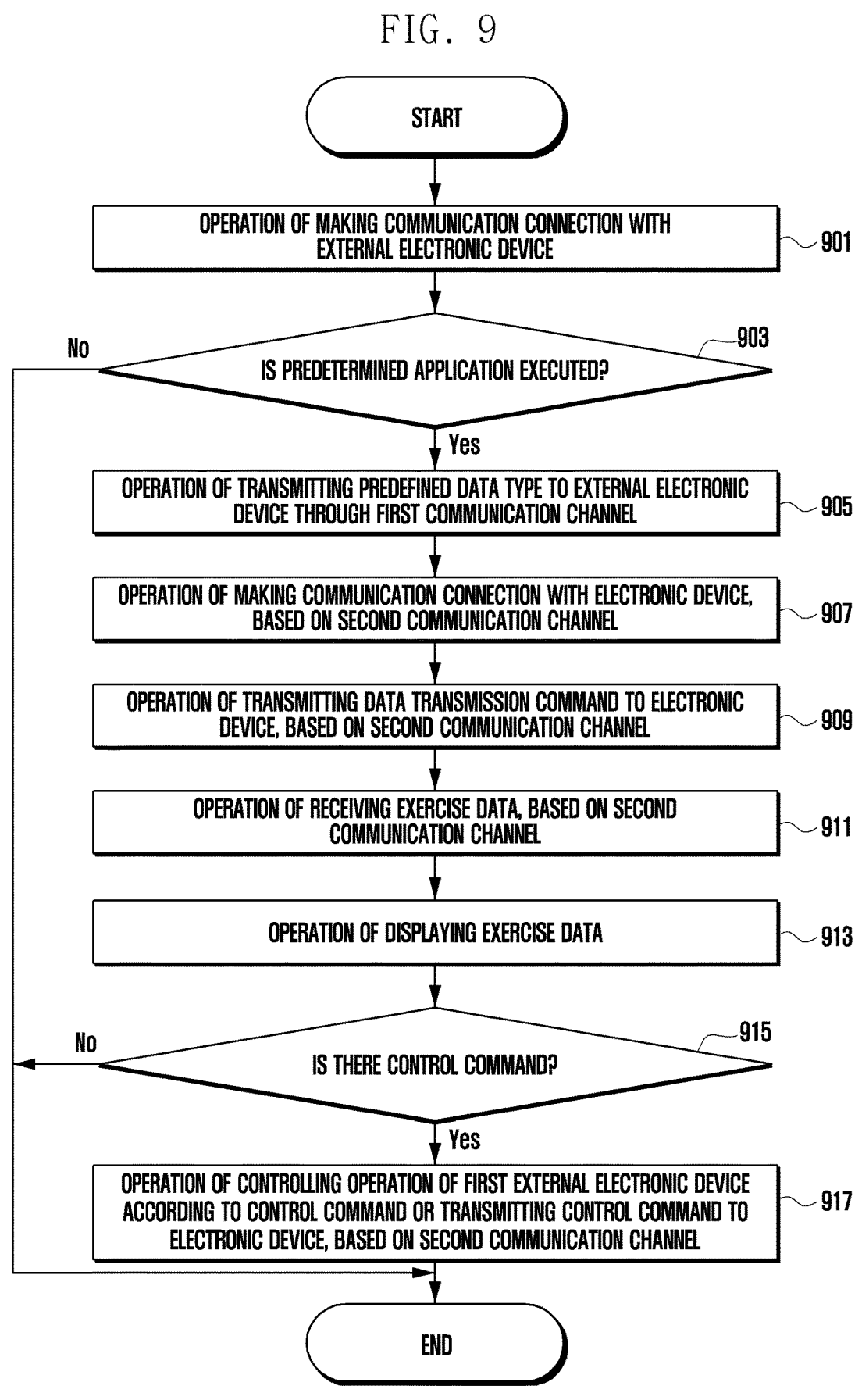

START

OPERATION OF MAKING COMMUNICATION CONNECTION WITH EXTERNAL ELECTRONIC DEVICE ~ 901

IS PREDETERMINED APPLICATION EXECUTED? ~ 903

No

Yes

OPERATION OF TRANSMITTING PREDEFINED DATA TYPE TO EXTERNAL ELECTRONIC DEVICE THROUGH FIRST COMMUNICATION CHANNEL ~ 905

OPERATION OF MAKING COMMUNICATION CONNECTION WITH ELECTRONIC DEVICE, BASED ON SECOND COMMUNICATION CHANNEL ~ 907

OPERATION OF TRANSMITTING DATA TRANSMISSION COMMAND TO ELECTRONIC DEVICE, BASED ON SECOND COMMUNICATION CHANNEL ~ 909

OPERATION OF RECEIVING EXERCISE DATA, BASED ON SECOND COMMUNICATION CHANNEL ~ 911

OPERATION OF DISPLAYING EXERCISE DATA ~ 913

IS THERE CONTROL COMMAND? ~ 915

No

Yes

OPERATION OF CONTROLLING OPERATION OF FIRST EXTERNAL ELECTRONIC DEVICE ACCORDING TO CONTROL COMMAND OR TRANSMITTING CONTROL COMMAND TO ELECTRONIC DEVICE, BASED ON SECOND COMMUNICATION CHANNEL ~ 917

END

ELECTRONIC DEVICE AND METHOD FOR PROVIDING EXERCISE DATA BY ELECTRONIC DEVICE

CROSS-REFERENCE TO RELATED APPLICATION(S)

This application is a continuation application, claiming priority under § 365(c), of an International application No. PCT/KR2022/011778, filed on Aug. 8, 2022, which is based on and claims the benefit of a Korean patent application number 10-2021-0105397, filed on Aug. 10, 2021, in the Korean Intellectual Property Office, the disclosure of which is incorporated by reference herein in its entirety.

BACKGROUND

1. Field

The disclosure relates to an electronic device and a method of providing exercise data by the electronic device.

2. Description of Related Art

Recently, electronic devices including a sensor capable of measuring a user's biometric information and/or exercise data (fitness data) have been developed.

One electronic device can be used while being carried and moved generally by pockets or hands, but may have the form that can be worn on a body part or various structures. The electronic device may service health and exercise information in that the electronic device can be worn on a user's body.

The above information is presented as background information only to assist with an understanding of the disclosure. No determination has been made, and no assertion is made, as to whether any of the above might be applicable as prior art with regard to the disclosure.

SUMMARY

In general, an electronic device including a sensor capable of measuring a user's biometric information and/or exercise data may be used through a communication connection with an external electronic device such as a smartphone, a tablet, television (TV), or set-top box having a display.

However, performing a specific function in order to make the communication connection between the electronic device and the external electronic device is cumbersome.

Aspects of the disclosure are to address at least the above-mentioned problems and/or disadvantages and to provide at least the advantages described below. Accordingly, an aspect of the disclosure is to provide an electronic device and a method of providing exercise data by the electronic device is to automatically provide exercise data which can be measured by the electronic device to an external electronic device without any input for user interworking when a function related to exercise is executed in the external electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a display (e.g., a display module), at least one sensor, a communication circuit, one or more processors, and memory storing one or more computer programs including computer-executable instructions that, when executed by the one or more processors, cause the electronic device to acquire first exercise data, based on a value measured using the at least one sensor in a first operation mode, generate and store first exercise summary data, based on the first exercise data, make a communication connection with a first external electronic device through the communication circuit, in case that a predefined data type is received from the first external electronic device, switch to a second operation mode, receive a data transmission command from the first external electronic device through the communication circuit, in case that the data transmission command is received, acquire second exercise data corresponding to content displayed on a second external electronic device, based on the value measured using the at least one sensor, transmit the second exercise data to the first external electronic device through the communication circuit in real time for a predetermined time, and receive second exercise summary data generated based on the second exercise data from the second external electronic device and perform control to store the second exercise summary data.

In accordance with another aspect of the disclosure, a method at an electronic device of providing exercise data is provided. The method includes acquiring first exercise data, based on a value measured using at least one sensor in a first operation mode, generating and storing first exercise summary data, based on the first exercise data, making a communication connection with a first external electronic device through a communication circuit, in case that a predefined data type is received from the first external electronic device, switching to a second operation mode, receiving a data transmission command from the first external electronic device through the communication circuit, in case that the data transmission command is received, acquiring second exercise data corresponding to content displayed on a second external electronic device, based on the value measured using the at least one sensor, transmitting the second exercise data to the first external electronic device through the communication circuit in real time for a predetermined time, and receiving second exercise summary data generated based on the second exercise data from a second external electronic device and perform control to store the second exercise summary data.

In accordance with another aspect of the disclosure, one or more non-transitory computer-readable storage media storing one or more computer programs including computer-executable instructions that, when executed by one or more processors of an electronic device, cause the electronic device to perform operations is are provided. The operations include acquiring first exercise data, based on a value measured using at least one sensor in a first operation mode, generating and storing first exercise summary data, based on the first exercise data, making a communication connection with a first external electronic device through a communication circuit, in case that a predefined data type is received from the first external electronic device, switching to a second operation mode; receiving a data transmission command from the first external electronic device through the communication circuit, in case that the data transmission command is received, acquiring second exercise data corresponding to content displayed on an external electronic device, based on the value measured using the at least one sensor, transmitting the second exercise data to the first external electronic device through the communication circuit in real time for a predetermined time; and receiving second exercise summary data generated based on the second exercise data from a second external electronic device and storing the second exercise summary data.

An electronic device and a method of providing exercise data by the electronic device according to an embodiment of the disclosure can provide seamless user experience to a user by automatically providing exercise data which can be measured by the electronic device to an external electronic device without any input for user interworking when a function related to exercise is executed in the external electronic device.

An electronic device and a method of providing exercise data by the electronic device according to an embodiment of the disclosure can dynamically reconfigure a service provided by the electronic device by automatically providing exercise data which can be measured by the electronic device to an external electronic device without any input for user interworking when a function related to exercise is executed in the external electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates a communication connection operation between an electronic device and a first external electronic device according to an embodiment of the disclosure;

FIG. 7 is a flowchart illustrating a method of providing exercise data by the electronic device according to an embodiment of the disclosure;

FIG. 9 is a flowchart illustrating a method by which the first external electronic device establishes a second communication channel with the electronic device through the second external electronic device and receives exercise data from the electronic device according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a micropro-cessor unit (MPU), a system on chip (SoC), an integrated circuit (IC), or the like.

Figure 1:
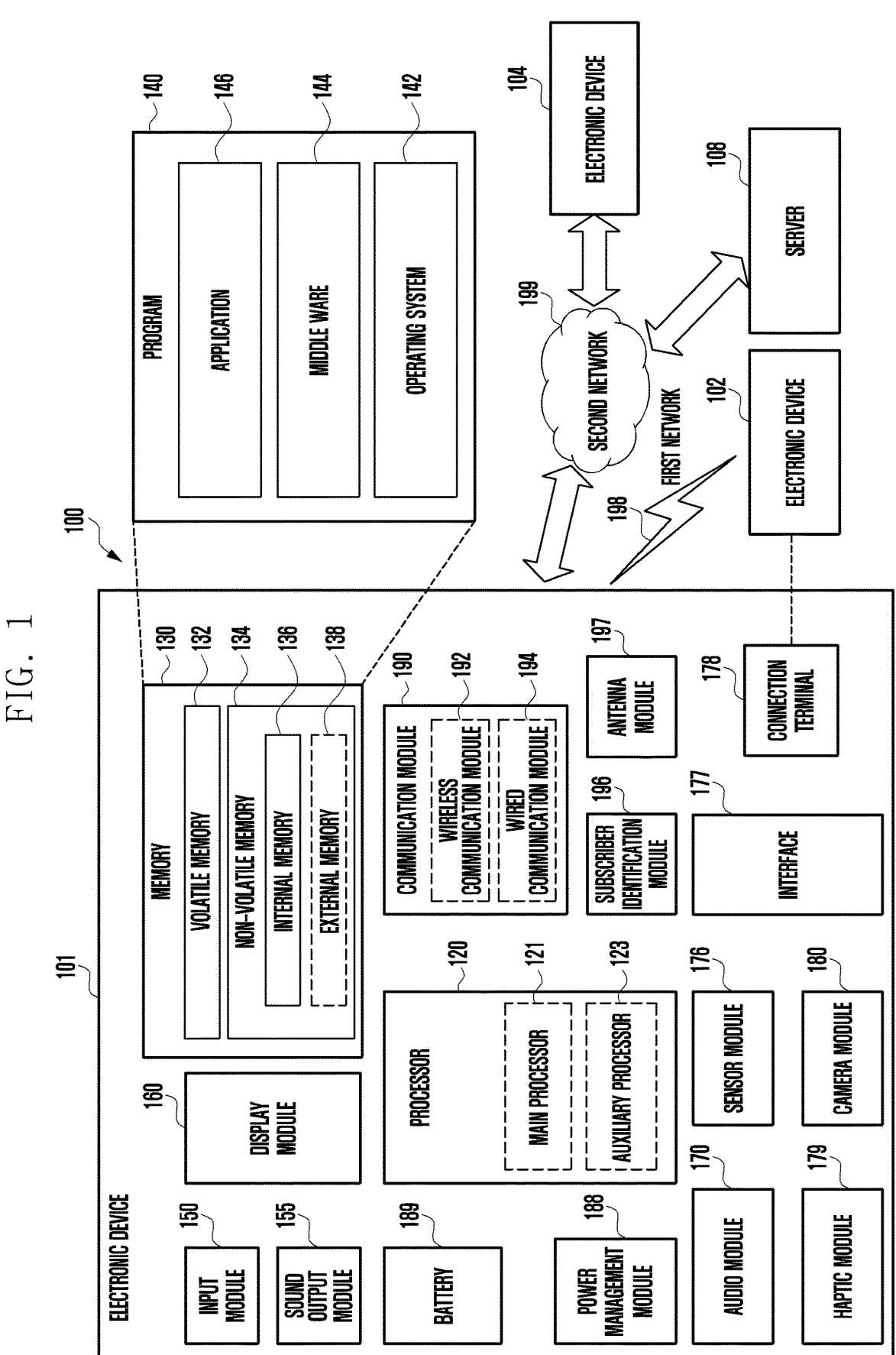
FIG. 1 is a block diagram of an electronic device within a network environment according to an embodiment of the disclosure.

FIG. 1 is a block diagram illustrating an electronic device 101 in a network environment 100 according to an embodi-ment of the disclosure.

Referring to FIG. 1, the electronic device 101 in the network environment 100 may communicate with an elec-tronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identifica-tion module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be imple-mented as a single component (e.g., the display module 160).

The processor 120 may execute, for example, software (e.g., a program 140) to control at least one other component (e.g., a hardware or software component) of the electronic device 101 coupled with the processor 120, and may per-form various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the commu-nication module 190) among the components of the elec-tronic device 101, instead of the main processor 121 while the main processor 121 is in an inactive (e.g., sleep) state, or together with the main processor 121 while the main pro-cessor 121 is in an active state (e.g., executing an applica-tion). According to an embodiment, the auxiliary processor 123 (e.g., an image signal processor or a communication processor) may be implemented as part of another compo-nent (e.g., the camera module 180 or the communication module 190) functionally related to the auxiliary processor 123. According to an embodiment, the auxiliary processor 123 (e.g., the neural processing unit) may include a hard-ware structure specified for artificial intelligence model processing. An artificial intelligence model may be gener-ated by machine learning. Such learning may be performed, e.g., by the electronic device 101 where the artificial intel-ligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide informa-tion to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 illustrates a communication connection operation between the electronic device 101 and the first external electronic device 102 according to an embodiment of the disclosure.

The electronic device 101 may include one or more sensors capable of measuring exercise data of a user of the electronic device 101. The electronic device 101 including one or more sensors capable of measuring exercise data of the user may include a device which can be mounted to a body and/or a device which can be mounted to equipment as, for example, a fitness tracker. The device which can be mounted to the body may be a smart band, a smart watch, a smart chip, and/or a smart ring, and the device which can be mounted to the equipment may be a smart chip, a bike sensor, and/or a treadmill sensor.

The first external electronic device 102 may include elements which are the same as or similar to those of the electronic device 101 illustrated in FIGS. 1 and 2. The first external electronic device 102 may include a processor (for example, the processor 120 of FIG. 1), a memory (for example, the memory 130 of FIG. 1), an input module (for example, the input module 150 of FIG. 1), a sound output module (for example, the sound output module 155 of FIG. 1), a display module (for example, the display module 160 of FIG. 1), an audio module (for example, the audio module 170 of FIG. 1), a sensor module (for example, the sensor module 176 of FIG. 1), an interface (for example, the interface 177 of FIG. 1), a connection terminal (for example, the connection terminal 178 of FIG. 1), a haptic module (for example, the haptic module 179 of FIG. 1), a camera module (for example, the camera module 180 of FIG. 1), a power management module (for example, the power manage module 188 of FIG. 1), a battery (for example, the battery 189 of FIG. 1), a communication module (For example, the communication module 190 of FIG. 1), a subcarrier identification module (for example, the subscriber identification module 196 of FIG. 1), or an antenna module (for example, the antenna module 197 of FIG. 1).

The first external electronic device 102 is a device including a display module (for example, the display module 160 of FIG. 1) and may be an electronic device such as a smartphone, a tablet, a TV, or a set-top box.

The electronic device 101 may include the sensor module 176. The sensor module 176 may include one or more sensors. The sensor module 176 may include a biometric optical sensor. The biometric optical sensor may include a light source, a light detector, and a sensor integrated circuit (IC). For example, the sensor module 176 of the electronic device 101 may output an optical signal to a user's body part through the light source (for example, light emitting diode (LED)), accumulate photocurrent corresponding to an amount of incident light reflected or penetrated using a photodetector (for example, photodiode), and convert a biometric signal in the analog current form according to the accumulated photocurrent into a digital signal.

The light source may include one or more light emitting diodes having various wavelengths. For example, the biometric optical sensor may include one or more LEDs for respective wavelength bands.

Green wavelengths (490 to 530 nm) penetrate the human body shallowly and are resistant to noise. The biometric optical sensor may measure a heart rate (HR) by using light of the green wavelengths.

Red wavelengths (645 to 700 nm) penetrate the human skin relatively deeper than the green wavelengths. The biometric optical sensor may measure heart rate (HR) more accurately by using light of the red wavelengths. The longer the wavelength of light, the more deeply it penetrates the human skin. The biometric optical sensor may acquire biometric information on a heart rate and blood oxygen saturation (SPO2) by irradiating light of infrared wavelengths (700 nm or higher) and light of red wavelengths at the same time or different times. Alternatively, the biometric optical sensor may measure blood glucose trends by using light of blue wavelengths (430 to 480 nm).

The biometric optical sensor may acquire various pieces of biometric information by using light sources having various wavelengths.

The light detector may include one or more photodiodes. The light detector may correspond to the light source or may be separated therefrom.

The sensor IC may include a sensor driver controller and an analog to digital converter (ADC). The sensor driver controller may control driving of the light source and the light detector. The ADC may convert an analog signal of the light detector into a digital signal. The sensor IC may amplify a light signal acquired from the light detector, remove noise through a filter, and transfer the signal converted into a digital signal to the processor 120.

In an embodiment of the disclosure, the sensor module 176 of the electronic device 101 may include an electrode and an analog-digital converter. The electrode may directly come in contact with a user's skin. For example, the electrode coming in contact with the skin may be used to detect or measure electric resistance or electric conductivity. The electrode may be used to measure or detect a voltage corresponding to the electric resistance or a voltage corresponding to the electric conductivity. The electrode may measure a biometric signal in an analog form (for example, a BIA signal or an ECG signal) and transfer the measured signal in the analog form into the analog-digital converter (ADC). The sensor module may operate to acquire a plurality of pieces of biometric information, for example, biometric information of two or more of a heart rate, blood oxygen saturation, a BIA signal, an ECG signal, and blood pressure. For example, the sensor module 176 may operate to simultaneously acquire the heart rate, the blood oxygen saturation, and the BIA signal.

In an embodiment of the disclosure, the sensor module 176 of the electronic device 101 may include a laser diode (LD), and an image sensor.

The processor 120 may generate biometric information and/or exercise data (fitness data), based on the digital signal transferred from the biometric sensor.

In an embodiment of the disclosure, the sensor driver controller may be implemented as an analog front end (AFE). The analog front end (AFE) may include an operation of a signal amplifier for amplifying a signal of the light source and the light detector, an operation of an ADC for converting an analog signal of the light detector into a digital signal, and an operation of a controller for controlling driving of the light source and the light detector.

The electronic device 101 may acquire user context information and/or exercise data, based on a signal measured through an acceleration sensor, a proximity sensor, a gyro sensor, a compass sensor, a temperature sensor (or a body temperature sensor), and/or an iris sensor included in the sensor module 176 according to the control of the processor 120.

The electronic device 101 may acquire external environment information of the user and/or exercise data, based on a signal measured through a temperature sensor, a humidity sensor, an illumination sensor, a time of flight (ToF) sensor, an angle of arrival (AoA) sensor, and/or a ultra-wide band (UWB) sensor included in the sensor module 176 according to the control of the processor 120.

The electronic device 101 may further include a gas sensor and/or a fine dust sensor. The electronic device 101 may acquire exercise data by measuring a user's external atmospheric environment or measuring a user's breathing, based on the gas sensor and/or the fine dust sensor according to the control of the processor 120.

The electronic device 101 may acquire exercise by measuring an external situation or a location of the electronic device 101 through a global navigation satellite system (GNSS) communication module included in the communication module 190 and/or wireless fidelity (WiFi) according to the control of the processor 120.

The electronic device 101 and the first external electronic device 102 may be connected through communication using a first communication channel 201. The first communication channel 201 may be, for example, a short-range communication (for example, Bluetooth (BT) or WiFi) channel. After the electronic device 101 is connected to the first external electronic device 102 through communication using the first communication channel 201, the first external electronic device 102 may execute an application or a program related to exercise.

When the application or the program related to exercise is executed in the first external electronic device 102, the electronic device 101 and the first external electronic device 102 may be connected through communication, based on a second communication channel 202.

In an embodiment of the disclosure, the electronic device 101 may be connected to the first external electronic device 102 through communication, based on the first communication channel 201 as the application or the program related to exercise is executed in the first external electronic device 102.

When the connection to the first external electronic device 102 is made through the first communication channel 201, it may be determined whether a predefined data type is received from the first external electronic device 102 through the first communication channel 201, and the electronic device 101 and the first external electronic device 102 may be connected through communication, based on the second communication channel 202.

The second communication channel 202 may be, for example, a Bluetooth low energy (BLE) communication channel.

When the electronic device 101 is connected to the first external electronic device 102 through communication based on the second communication channel 202, the electronic device 101 may operate in an accessory mode (or a peripheral mode) to transmit exercise data measured by the electronic device 101 to the first external electronic device 102.

When the electronic device 101 operates in the accessory mode (or peripheral mode), the electronic device 101 may display a user interface indicating the operation in the accessory mode on the display module 160 according to the control of the processor 120. For example, the user interface may be an exercise abstract information screen.

The electronic device 101 may transmit exercise generated based on biometric information measured using the sensor module 176, context information of the user (or the electronic device 101) and/or external environment information of the user (or the electronic device 101) to the first external electronic device 102 through the second communication channel.

The electronic device 101 may collect or measure exercise data, based on one or more profiles or services related to the exercise data according to the control of the processor 120. The one or more profiles or services related to the exercise data may include characteristics required for respective services.

The one or more profiles or services related to the exercise data may be profiles or services based on generic attribute profile (GATT) or profiles or services defined by a manufacturer.

For example, the electronic device 101 may collect or measure exercise data, based on a heart rate service corresponding to a BLE standard GATT service and/or a running speed and cadence service according to the control of the processor 120.

For example, the electronic device 101 may collect or measure exercise data, based on a profile or a service defined by a service provider or a manufacturer according to the control of the processor 120.

The profile or the service defined by the service provider or the manufacturer may include, for example, an exercise data service and/or a fitness program service.

For example, the exercise data may include at least one of a heart rate, calories consumed through exercise, an RR interval, a stride length, a walking or running status, an instant speed, an average speed, instant cadence, average cadence, an instant pace, an average pace, an instant heart rate, an average heart rate, a total distance, total calories, a repetition count, an exercise type, and/or exercise duration. The RR interval may be an interval between R-peaks of the heart rate.

In an embodiment of the disclosure, the exercise data may include a sensor detected or not status according to whether the user wears the electronic device 101, an operation state of a fitness program (or application), and/or information on the fitness program (or application). The operation state of the fitness program (or application) may include, for example, start, resume, pause, stop, close, and/or go operations of the fitness program (or application).

TABLE 1

| Service requested by first external electronic device 102 | Service or profile included in electronic device 101 |
|---|---|
| Fitness data | Fitness Program Service, Heart Rate Service, Device Information Service |
| Heart rate data | Heart Rate Service, Device Information Service |

Referring to Table 1, when operating in the accessory mode (or peripheral mode) during the connection with the first external electronic device 102 through communication based on the second communication channel 202, the electronic device 101 may designate a service for measuring and collecting exercise data among one or more profiles or services related to the exercise data. Referring to Table 1, when operating in the accessory mode (or peripheral mode) during the connection with the first external electronic device 102 through communication based on the second communication channel 202, the electronic device 101 may designate a service for measuring and collecting exercise data, based on a data type among one or more profiles or services related to the exercise data. Referring to Table 1, the electronic device 101 may reconfigure one or more profiles or services related to exercise data according to a request from the first external electronic device 102 or a predefined data type transmitted by the first external electronic device 102 and measure and/or collect exercise data, based on the one or more reconfigured profiles or services related to the exercise data according to the control of the processor 120.

The electronic device 101 may transmit exercise generated based on biometric information measured using the sensor module 176, context information of the user (or the electronic device 101) and/or external environment information of the user (or the electronic device 101) to the first external electronic device 102 through the second communication channel according to the control of the processor 120.

When the electronic device 101 transmits exercise data to the first external electronic device 102, based on the second communication channel, the electronic device 101 does not combine the exercise data with other exercise data and/or exercise summary data stored in the memory 130 and may transmit the exercise data to the first external electronic device 102 in real time simultaneously with collection and measurement of the exercise data.

After the communication connection through the second communication channel 202 between the electronic device 101 and the first external electronic device 102 ends, the electronic device 101 may be updated from or synchronized with a second external electronic device. After the communication connection through the second communication channel 202 between the electronic device 101 and the first external electronic device 102 ends, the first external electronic device 102 may update or synchronize exercise data with a server and the server may synchronize exercise data with the second external electronic device. Thereafter, when the electronic device 101 is connected to the second external electronic device through communication, the electronic device 101 may update or synchronize exercise data with the second external electronic device.

In an embodiment, after the communication connection through the second communication channel 202 between the electronic device 101 and the first external electronic device 102 ends, the electronic device 101 may update or synchronize exercise data and/or exercise summary data with the server 108, the first external electronic device 102, or the second external electronic device.

Figure 3:
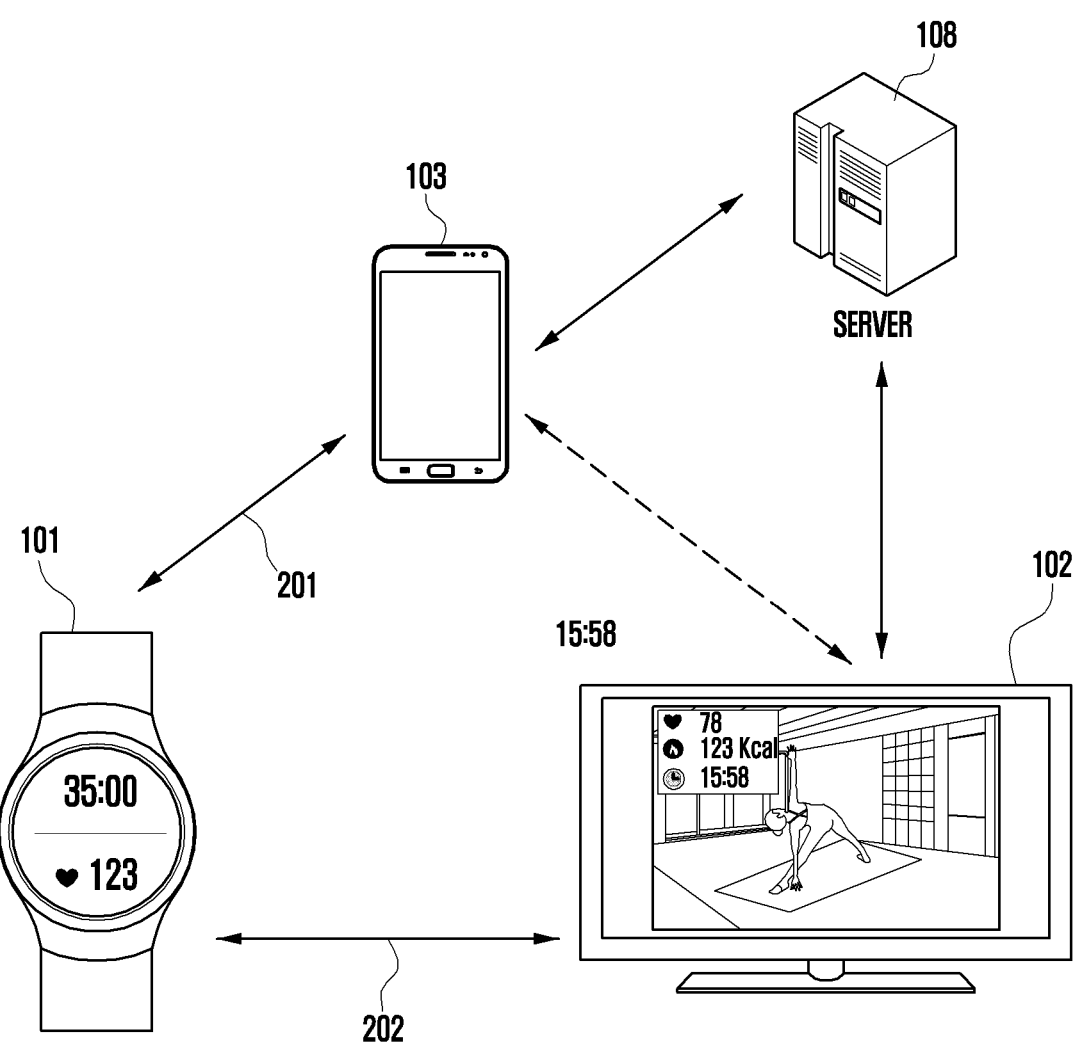
FIG. 3 illustrates a communication connection operation between the electronic device, the first external electronic device, and a second external electronic device according to an embodiment of the disclosure.

FIG. 3 illustrates a communication connection operation between the electronic device 101, the first external electronic device 102, and the second external electronic device 103 according to an embodiment of the disclosure.

FIG. 3 schematically illustrates a method of making a communication connection using the second communication channel 202 between the electronic device 101 and the first external electronic device 102 through the second external electronic device 103.

The electronic device 101 and the first external electronic device 102 of FIG. 3 may be the same as the electronic device 101 and the first external electronic device 102 of FIG. 2.

The second external electronic device 103 may include elements which are the same as or similar to the electronic device 101 illustrated in FIG. 1. The second external electronic device 103 may include a processor (for example, the processor 120 of FIG. 1), a memory (for example, the memory 130 of FIG. 1), an input module (for example, the input module 150 of FIG. 1), a sound output module (for example, the sound output module 155 of FIG. 1), a display module (for example, the display module 160 of FIG. 1), an audio module (for example, the audio module 170 of FIG. 1), a sensor module (for example, the sensor module 176 of FIG. 1), an interface (for example, the interface 177 of FIG. 1), a connection terminal (for example, the connection terminal 178 of FIG. 1), a haptic module (for example, the haptic module 179 of FIG. 1), a camera module (for example, the camera module 180 of FIG. 1), a power management module (for example, the power manage module 188 of FIG. 1), a battery (for example, the battery 189 of FIG. 1), a communication module (For example, the communication module 190 of FIG. 1), a subcarrier identification module (for example, the subscriber identification module 196 of FIG. 1), or an antenna module (for example, the antenna module 197 of FIG. 1).

The second external electronic device 103 is a device including a display module (for example, the display module 160 of FIG. 1) and may be an electronic device such as a smartphone, a tablet, TV, or a set-top box.

In an embodiment, the electronic device 101 may be a fitness tracker, the first external electronic device 102 is a device including a display module (for example, the display module 160 of FIG. 1) and may be an electronic device such as TV, and the second external electronic device 103 may be a smartphone.

The electronic device 101 and the second external electronic device 103 may be connected through communication using the first communication channel 201, and the first external electronic device 102 and the second external electronic device 103 may be connected through communication using the first communication channel 201.

At this time, the electronic device 101 and the first external electronic device 102 may not be connected to each other through communication.

The first external electronic device 102 may transmit an exercise data transmission request or a predefined data type related to the exercise data transmission request to the second external electronic device 103 through the first communication channel 201 according to the control of a processor (for example, the processor 120 of FIG. 1).

When the second external electronic device 103 receives an exercise data transmission request or a predefined data type related to the exercise data transmission request from the first external electronic device 102 through a communication channel (for example, WiFi, near field communication (NFC), ultra-wideband (UWB), or Bluetooth), the second external electronic device 103 may transmit the exercise data transmission request or the predefined data type related to the exercise data transmission request to the electronic device 101 through the first communication channel 201 according to the control of the processor (For example, the processor 120 of FIG. 1).

The first external electronic device 102 and the second external electronic device 103 may be devices registered in the server 108, based on the same user account. The server 108 may collect and store information for the communication connection of registered devices such as the first external electronic device 102 and the second external electronic device 103. The information for the communication connection of the registered devices may be stored not only in the server 108 but also in the second external electronic device 103.

When the server 108 receives the exercise data transmission request or the predefined data type related to the exercise data transmission request from the first external electronic device 102, the server 108 may transmit the exercise data transmission request or the predefined data type related to the exercise data transmission request to the second external electronic device 103. When the second external electronic device 103 receives the exercise data transmission request or the predefined data type related to the exercise data transmission request from the server 108, the second external electronic device 103 may transmit the exercise data transmission request or the predefined data type related to the exercise data transmission request to the electronic device 101 through the first communication channel 201 according to the control of the processor (for example, the processor 120 of FIG. 1).

When the electronic device 101 receives the exercise data transmission request or the predefined data type related to the exercise data transmission request from the second external electronic device 103 through the first communication channel 201, the electronic device 101 may make the communication connection with the first external electronic device 102 through the second communication channel 202 according to the control of the processor 120.

When the electronic device 101 operates in the accessory mode (or peripheral mode) during the communication connection with the first external electronic device 102 based on the second communication channel 202, the electronic device 101 may designate a service for measuring and collecting exercise data among one or more profiles or services related to the exercise data.

The electronic device 101 may reconfigure one or more profiles or services related to exercise data according to a request from the first external electronic device 102 or a predefined data type transmitted by the first external electronic device 102 and measure and/or collect exercise data, based on the one or more reconfigured profiles or services related to the exercise data according to the control of the processor 120.

The electronic device 101 may transmit exercise generated based on biometric information measured using the sensor module 176, context information of the user (or the electronic device 101) and/or external environment information of the user (or the electronic device 101) to the first external electronic device 102 through the second communication channel.

When the electronic device 101 transmits exercise data to the first external electronic device 102, based on the second communication channel, the electronic device 101 may not combine the exercise data with other exercise data and/or exercise summary data stored in the memory 130 and may transmit the exercise data to the first external electronic device 102 in real time simultaneously with collection and measurement of the exercise data.

After the communication connection through the second communication channel 202 between the electronic device 101 and the first external electronic device 102 ends, the electronic device 101 may be updated from or synchronized with the second external electronic device 103. After the communication connection between the electronic device 101 and the first external electronic device 102 through the second communication channel 202 ends, the first external electronic device 102 may update or synchronize exercise data and/or exercise summary data with the server 108, and the server 108 may synchronize the exercise data and/or the exercise summary data with the second external electronic device 103. Thereafter, when the communication connection is made between the electronic device 101 and the second external electronic device 103, exercise data and/or exercise summary data may be updated or synchronized with the second external electronic device 103.

After the communication connection between the electronic device 101 and the first external electronic device 102 through the second communication channel 202 ends, the electronic device 101 may update or synchronize exercise data and/or exercise summary data with the server 108, the first external electronic device 102, or the second external electronic device 103.

Figure 4:
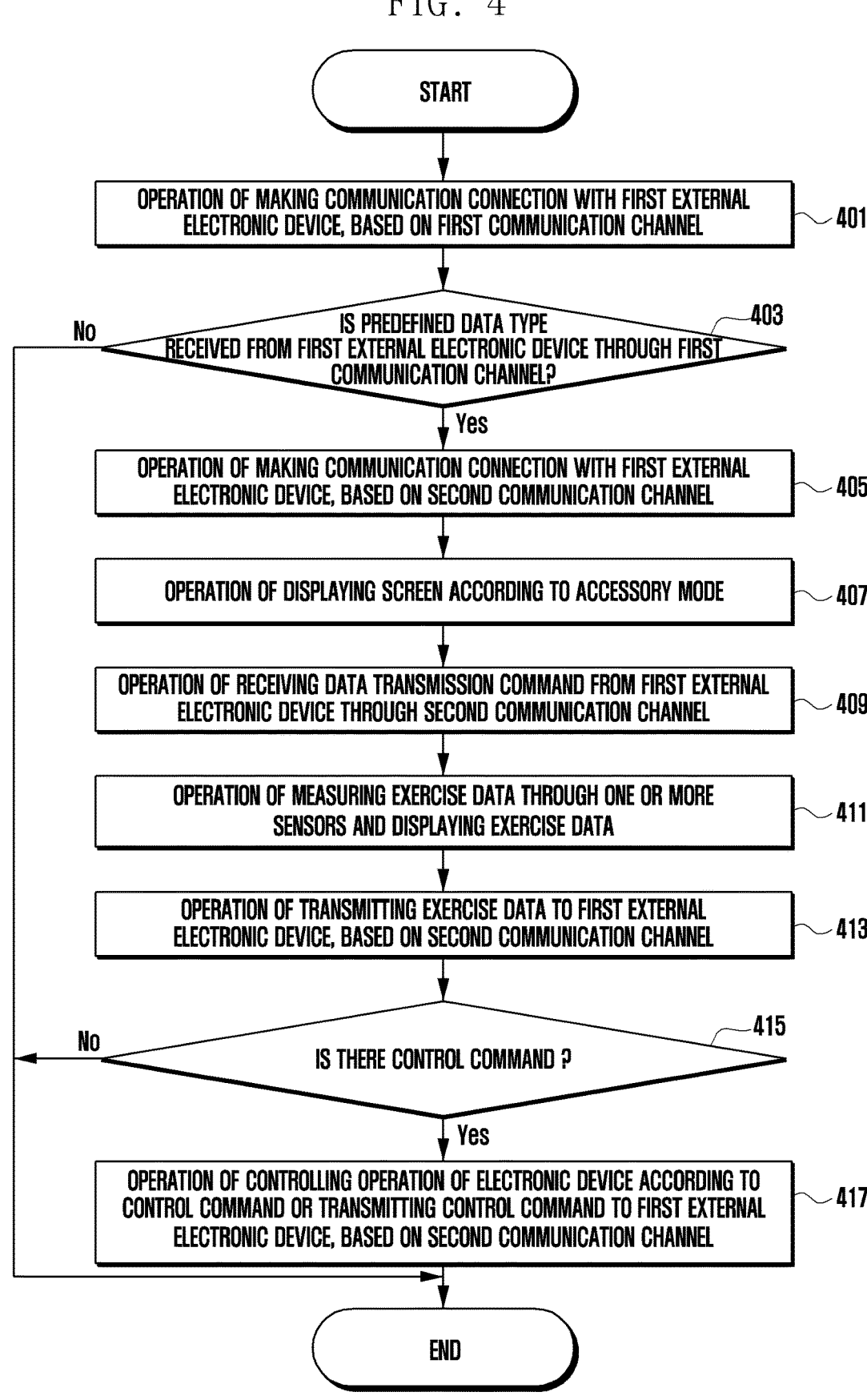
FIG. 4 is a flowchart illustrating a method of providing exercise data by the electronic device according to an embodiment of the disclosure.

FIG. 4 is a flowchart illustrating a method of providing exercise data by the electronic device 101 according to an embodiment of the disclosure.

At least some of the operations illustrated in FIG. 4 may be omitted. Before or after at least some operations illustrated in FIG. 4, at least some operations described with reference to other drawings in the disclosure may be additionally inserted. The operations illustrated in FIG. 4 may be performed by the processor 120. For example, the memory 130 of the electronic device 101 may store instructions causing the processor 120, when executed, to perform at least some operations illustrated in FIG. 4.

The electronic device 101 may make the communication connection with the first external electronic device 102, based on the first communication channel 201 according to the control of the processor 120 in operation 401. The first communication channel 201 may be, for example, a short-range communication (for example, Bluetooth (BT) or WiFi) channel.

When the communication connection with the first external electronic device 102 is made based on the first communication channel 201, the electronic device 101 may receive a request for information on an application version of the electronic device 101, a data type supported by the electronic device 101 or information for the communication connection (device identification (ID)) from the first external electronic device 102, based on the first communication channel 201 according to the control of the processor 120 in operation 401.

In an embodiment of the disclosure, when the electronic device 101 has been already connected to the first external electronic device 102 through communication, based on the first communication channel 201, operation 401 may be omitted.

When receiving the request for the information on the application version of the electronic device 101, the data type supported by the electronic device 101, or the information for the communication connection (for example, device ID) from the first external electronic device 102, the electronic device 101 may transmit the information on the application version of the electronic device 101, the data type supported by the electronic device 101, or the information for the communication connection (for example, device ID) to the first external electronic device 102, based on the first communication channel 201 according to the control of the processor 120 in operation 401.

The first external electronic device 102 and the electronic device 101 may make a request for or transmit the information on the application version of the electronic device 101, the data type supported by the electronic device 101, or the information for the communication connection (for example, device ID) by using a Bluetooth serial port profile (BT SPP) based on a secure RFCOMM protocol of a Bluetooth (BT) communication channel. The electronic device 101 may determine whether a predefined data type is received from the first external electronic device 102 through the first communication channel 201 according to the control of the processor 120 in operation 403. For example, as an application or a program related to exercise is executed in the first external electronic device 102, the electronic device 101 may determine whether a predefined data type is received from the first external electronic device 102. When the predefined data type is not received from the first external electronic device 102 through the first communication channel 201, the electronic device 101 may perform a function currently executed in the electronic device 101 according to the control of the processor 120.

When the predefined data type is received from the first external electronic device 102 through the first communication channel 201, the electronic device 101 may proceed to operation 405 from operation 403.

The predefined data type may be data making a request for transmitting exercise data and/or data making a request for establishing the second communication channel 202.

In an embodiment of the disclosure, the predefined data type may be a request for switching the accessory mode of the electronic device 101.

The predefined data type may be a signal transmitted from the first external electronic device 102 to the electronic device 101 automatically without any intervention of the user when a predetermined application (for example, an application related to exercise) is executed in the first external electronic device 102.

The first external electronic device 102 may identify one or more profiles or services related to exercise data which can be used by the electronic device 101 and transmit data making a request for transmitting exercise data to the electronic device 101 through the first communication channel 201.

For example, the first external electronic device 102 may identify one or more profiles or services related to exercise data which can be used by the electronic device 101 and transmit information on a data type corresponding to the one or more profiles or services related to the exercise data which can be used to the electronic device 101.

The data making the request for establishing the second communication channel 202 may be, for example, out of band (OOB) data for the secure connection to the second communication channel 202. An out of band (OOB) pairing method may be a method of transmitting pairing information through an already connected channel other than the channel for the connection of pairing information and performing pairing.

The first external electronic device 102 may transmit BLE out of band (OOB) data through the first communication channel 201 for the connection of the second communication channel 202. When receiving the out of band (OOB) data or the BLE out of band (OOB) data using the second communication channel 202, the electronic device 101 may be connected to the first external electronic device 102 through the communication using the second communication channel 202.

The electronic device 101 may make the communication connection with the first external electronic device 102, based on the second communication channel 202 according to the control of the processor 120 in operation 405.

When receiving a predefined data type from the first external electronic device 102 according to the control of the processor 120 in operation 405, the electronic device 101 may operate in an accessory mode (or peripheral mode) through the second communication channel 202 and transmit a signal including an advertisement packet. The signal including the advertisement packet may be a signal transmitted to all nearby devices without designating a specific device.

The first external electronic device 102 may receive or scan the signal including the advertisement packet transmitted from the electronic device 101 and may be connected to the electronic device 101 through communication using the second communication channel 202.

The first external electronic device 102 may search for the electronic device 101 including a device ID received through reception or scanning of the signal including the advertisement packet and perform a pairing process after the second communication channel 202. At this time, the first external electronic device 102 may operate in a central mode.

The electronic device 101 may display a screen on the display module 160 according to the accessory mode (or peripheral mode) according to the control of the processor 120 in operation 407.

The electronic device 101 may display a user interface indicating the operation of the accessory mode (or peripheral mode) on the display module 160 according to the control of the processor 120 in operation 407.

For example, the user interface indicating the operation in the accessory mode (or peripheral mode) may be text or an icon.

For example, the user interface indicating the operation in the accessory mode (or peripheral mode) may be a user interface having information displaying on the screen being smaller than that of a normal mode or a simplified user interface. The normal mode may be a state in which the electronic device 101 independently operates without operating in the peripheral mode of the first external electronic device 102.

In an embodiment of the disclosure, the electronic device 101 may first perform operation 405 before operation 407 according to the control of the processor 120. The electronic device 101 may perform operation 407, based on reception of the predefined data type from the first external electronic device 102 in operation 403.

The electronic device 101 may receive a data transmission command from the first external electronic device 102 through the second communication channel 202 according to the control of the processor 120 in operation 409.

In an embodiment of the disclosure, the electronic device 101 may receive a data transmission command and/or user data from the first external electronic device 102 through the second communication channel 202 according to the control of the processor 120 in operation 409.

In an embodiment of the disclosure, the electronic device 101 may receive a data transmission command, user data, and/or a control command from the first external electronic device 102 through the second communication channel 202 according to the control of the processor 120 in operation 409.

TABLE 2

| Service provided by electronic device 101 | Universally unique identifier (UUID) |
| --- | --- |
| Fitness Program Service | 0000AD00-EBAE-4526-9511-8357C35D7BE2 |

TABLE 3

| Characteristics provided by electronic device 101 | Universally unique identifier (UUID) | Descriptor Client | Requirement Mandatory |
| --- | --- | --- | --- |
| Fitness Program Status | 0000AD01-EBAE-4526-9511-8357C35D7BE2 | Characteristic Configuration | |
| Fitness Program Info | 0000AD02-EBAE-4526-9511-8357C35D7BE2 | | |
| User Information | 0000FE02-EBAE-4526-9511-8357C35D7BE2 | | |

TABLE 4

| Service provided by electronic device 101 | Universally unique identifier (UUID) |
| --- | --- |
| Heart Rate Service | 0000180D-0000-1000-8000-00805F9B34FB |

TABLE 5

| Characteristics provided by electronic device 101 | Universally unique identifier (UUID) | Descriptor | Requirement |
| --- | --- | --- | --- |
| Heart Rate Measurement | 00002A37-0000-1000-8000-00805F9B34FB | Client Characteristic Configuration | Mandatory |

Table 2 and Table 3 show data transmission commands corresponding to fitness program services and characteristics, and Table 4 and Table 5 show data transmission commands corresponding to heart rate services and characteristics. Referring to Table 2 to Table 5, the data transmission commands may be, for example, commands for activating services or characteristics which the first external electronic device 102 desires to receive among one or more profiles or services related to exercise data reconfigured by the electronic device 102.

Referring to Table 2 to Table 5, the electronic device 101 may collect and/or measure exercise data, based on activated services or characteristics and transmit the exercise data to the first external electronic device 102, based on the second communication channel 202.

The data transmission commands may include information on programs (or applications) related to exercise. The information on the programs (or applications) related to exercise may be included in the data transmission commands and may be transmitted separately from the data transmission commands.

TABLE 6

| flags bit field | duration present | program title present | reserved for future use |
|---|---|---|---|
| bit position | 0(false: 0, true: 1) | 1(false: 0, true: 1) | 2-15 |

Content type 0: single program 1: fitness program 2: running

TABLE 7

| field name | flags | Device type | Program ID | Exercise type | Content type | Duration | Program title length | Program title |
|---|---|---|---|---|---|---|---|---|
| format | 16 bit | unit81: mobile 2: TV | unit 32 | unit 24 | unit8 | unit 24 (second) | unit8 | unit8 |
| requirement | M | M | M | M | M | O | O | O |

Table 6 and Table 7 are examples of tables defining information on programs (or applications) related to exercise being executed in the first external electronic device 102. The information on the programs (or applications) related to exercise may include data type information for currently transmitted or interworked exercise data, IDs for identifying programs (or applications) related to exercise, an exercise type, a content type, titles of programs (or applications) related to exercise, or information on reproduction time of programs (or applications) related to exercise.

TABLE 8

| fields |
|---|
| fitness program info (flag, device type, program ID, exercise type, content type, duration, program title length, program title)ex > flags= 00000011 00000000 (16 bit)device type(tv) = 0x02, program ID(1) = 0x00000001, exercise type(running) = 0xEA0300, content type(single program) = 0x00, duration(30 min) = 0x080700(1800 seconds), program title length(11) = 0x0B, program title = "Indoor Bike" |

Table 8 is an example of a table showing values which can be actually transmitted when information on programs (or applications) related to exercise which is actually executed in the first external electronic device 102 is transmitted to the electronic device 101. The electronic device 101 may measure exercise through one or more sensors included in the sensor module 176 and display the exercise data on the display module 160 according to the control of the processor 120 in operation 411.

The electronic device 101 may measure exercise data through one or more sensors included in the sensor module 176, based on user data and display the exercise data on the display module 160 according to the control of the processor 120 in operation 411.

The electronic device 101 may not combine the exercise data with other exercise data and/or exercise summary data stored in the memory 130 according to the control of the processor 120 in operation 411.

In an embodiment of the disclosure, the electronic device 101 may measure exercise through one or more sensors included in the sensor module 176, based on user data and display the exercise data on the display module 160 according to the control of the processor 120 in operation 411.

The user data may be, for example, data received from the first external electronic device 102. The user data may be, for example, data pre-stored in the memory 130 of the electronic device 101.

The user data may be information on a user's age or body information such as a height or weight of the user.

In an embodiment of the disclosure, the electronic device 101 may reconfigure one or more profiles or services related to exercise data according to a predefined data type transmitted by the first external electronic device 102 and measure and/or collect exercise data through one or more sensors, based on the one or more reconfigured profiles or services related to exercise data according to the control of the processor 120 in operation 411.

The electronic device 101 may transmit the collected and/or measured exercise data to the first external electronic device 102, based on the second communication channel 202 according to the control of the processor 120 in operation 413.

In an embodiment of the disclosure, the electronic device 101 may transmit the collected and/or measured exercise data and/or a control command to the first external electronic device 102, based on the second communication channel 202, according to the control of the processor 120 in operation 413.

The electronic device 101 may determine whether there is a control command according to the control of the processor 120 in operation 415.

When there is no control command, the electronic device 101 may perform a function currently executed in the electronic device 101 according to the control of the processor 120.

When there is a control command, the electronic device 101 may proceed to operation 417 from operation 415.

The electronic device 101 may control the operation of the electronic device 101 according to the control command or transmit the control command to the first external electronic device 102, based on the second communication channel 202, according to the control of the processor 120 in operation 417.

In an embodiment, when the control command is a request for stopping the accessory mode, the electronic device 101 may stop the connection of the second communication channel 202 and perform control to synchronize exercise data with the first external electronic device 102, the second external electronic device 103, or the server 108 according to the control of the processor 120 in operation 417.

In an embodiment of the disclosure, when the control command is a request for stopping the accessory mode, the electronic device 101 may stop the connection of the second communication channel 202 and perform control to synchronize exercise summary data with the first external electronic device 102, the second external electronic device 103, or the server 108 according to the control of the processor 120 in operation 417.

The control command is, for example, a control command for an operation state of a program (or application) related to exercise and may include start, resume, pause, stop, close, and/or go operations of the program (or application) related to exercise.

The program (or application) related to exercise may be executed in the first external electronic device 102 and may make a request for transmitting exercise data related to the program (or application) related to the exercise.

The control command may be selected through an input of the user of the electronic device 101, received from the first external electronic device 102 through the second communication channel 202, or generated when a call event from the electronic device 101 and/or the first external electronic device 102 is made and/or ends.

The user input may be an input through the input module 150 of the electronic device 101 and/or a touch input through a touch sensor of the display module 160.

When the call event is made (received and/or originated) through the communication module 190, the electronic device 101 and/or the first external electronic device 102 may generate a control command for pausing data measurement and/or transmission.

When the call event ends through the communication module 190, the electronic device 101 and/or the first external electronic device 102 may generate a control command for resuming exercise data measurement and/or transmission.

In an embodiment of the disclosure, even though the call event is generated (received and/or originated) through the communication module 190, the electronic device 101 and/or the first external electronic device 102 may continue exercise data measurement and/or transmission.

In an embodiment of the disclosure, when the call event is generated (received and/or originated) through the communication module 190, the electronic device 101 and/or the first external electronic device 102 may ask the user about whether to execute the control command for pausing or resuming exercise data measurement and/or transmission. For example, when the call event is generated (received and/or originated) through the communication module 190, the electronic device 101 and/or the first external electronic device 102 may display a user interface indicating whether to execute the control command for pausing or continuing exercise data measurement and/or transmission on the display module 160. For example, the user interface may be an exercise summary information screen.

In an embodiment of the disclosure, when the call event is generated (received and/or originated) through the communication module 190, the electronic device 101 and/or the first external electronic device 102 may preset the command for stopping or continuing exercise data measurement and/or transmission. For example, when the call event is generated (received and/or originated) through the communication module 190, the electronic device 101 and/or the first external electronic device 102 may display a user interface for pre-configuring the command for stopping or continuing exercise data measurement and/or transmission on the display module 160 and pre-store the command in the memory 130. For example, the user interface may be an exercise summary information screen.

TABLE 9

| | Flags Bit(s): 16 bit format | | | | |
|---|---|---|---|---|---|
| flags bit field | program ID present | program state present | schedule ID present | activity ID present | reserved for future use |
| bit position | 0(false: 0, true: 1) | 1(false: 0, true: 1) | 2(false: 0, true: 1) | 3(false: 0, true: 1) | 4-15(false: 0, true: 1) |

Operation code (OP code) 1: start or resume 2: pause
3: stop
4: close
5: go

TABLE 10

| field name format | flags 16bit | op code unit8 | program id unit 32 | program state unit8 |
|---|---|---|---|---|
| requirement | M | M | O | O |

Program state 0: ongoing 1: preview
2: rest

A control command for an operation state of a program (or application) related to exercise Table 9 and Table 10 are tables showing data defining control commands for operations states of programs (or applications) related to exercise. Referring to Table 6 and Table 7, data corresponding to start, resume, pause, stop, close, and/or go operations of the programs (or applications) related to exercise may be predefined.

TABLE 11

| OP code | Field |
|---|---|
| Start or resume | (Flags, OP code, Program ID, Program State)Ex > Flags = 00000011 00000000 (16 bit)OP code = 0x01, Program ID(1) = 0x00000001, Program State(ongoing) = 0x00 |
| Pause | (Flags, OP code, Program ID, Program State)Ex > Flags = 00000011 00000000 (16 bit)OP code = 0x02, Program ID(1) = 0x00000001, Program State(ongoing) = 0x00 |
| Stop | (Flags, OP code, Program ID)Ex > Flags = 00000001 00000000 (16 bit)OP code = 0x03, Program ID(1) = 0x00000001 |
| Close | (Flags, OP code)Ex > Flags = 00000000 00000000 (16 bit)OP code = 0x04 |

Table 11 is an example of a table showing values which can be actually transmitted when the electronic device 101 transmits data corresponding to start, resume, pause, stop, close, and/or go operations of the programs (or applications) related to exercise to the first external electronic device 102 or inversely the first external electronic device 102 transmits the same to the electronic device 101.

Figure 5:
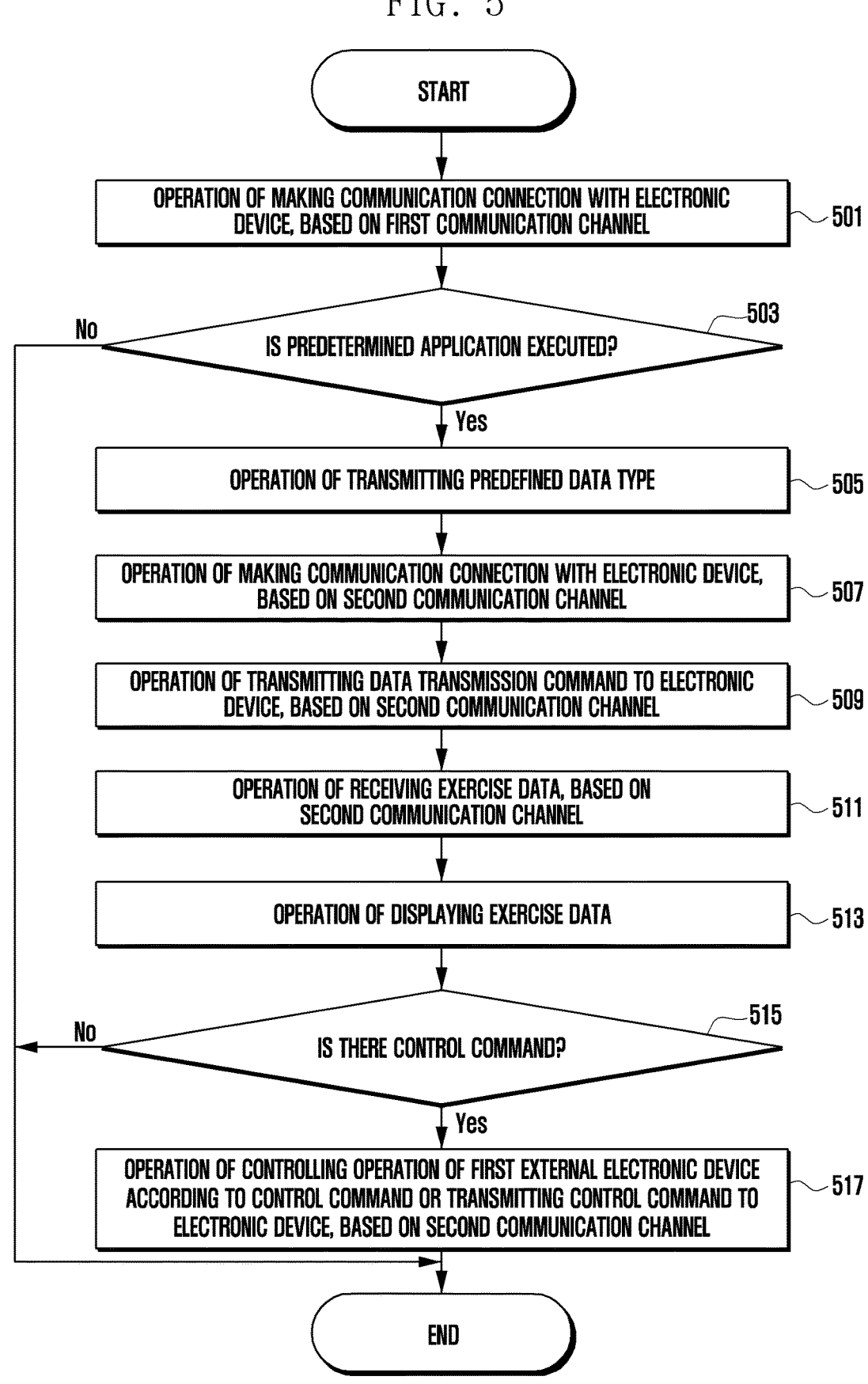
FIG. 5 is a flowchart illustrating a method by which the first external electronic device receives exercise data from the electronic device according to an embodiment of the disclosure.

FIG. 5 is a flowchart illustrating a method by which the first external electronic device 102 receives exercise data from the electronic device 101 according to an embodiment of the disclosure.

The first external electronic device 102 may make a communication connection with the first external electronic device 102, based on the first communication channel 201, according to the control of a processor (for example, the processor 120 of FIG. 1) in operation 501. The first communication channel 201 may be, for example, a short-range communication (for example, Bluetooth (BT) or WiFi) channel. In an embodiment, the first external electronic device 102 may first perform operation 503 before performing operation 501 according to the control of the processor 120. After determining whether a predetermined application is executed in operation 503, the first external electronic device 102 may make the communication connection with the electronic device 101, based on the first communication channel 201.

In an embodiment of the disclosure, when the first external electronic device 102 has been already connected to the electronic device through communication based on the first communication channel 201, operation 501 may be omitted.

The first external electronic device 102 may determine whether a predetermined application is executed according to the control of the processor (for example, the processor 120 of FIG. 1) in operation 503.

When the predetermined application is not executed, the first external electronic device 102 may perform a function currently executed in the first external electronic device 102 according to the control of the processor (for example, the processor 120 of FIG. 1).

When the predetermined application is executed, the first external electronic device 102 may proceed to operation 505 from operation 503.

The predetermined application is an application requiring exercise data, for example, a program (or application) related to exercise.

When the predetermined application is executed according to the control of the processor (for example, the processor 120 of FIG. 1), the first external electronic device 102 may transmit a predefined data type to the electronic device 101 through the first communication channel 201 in operation 505.

In an embodiment of the disclosure, when the predetermined application is executed according to the control of the processor (for example, the processor 120 of FIG. 1), the first external electronic device 102 may make a request for establishing the second communication channel 202 in operation 505.

The predefined data type may be data making a request for transmitting exercise data and/or data making a request for establishing the second communication channel 202.

In an embodiment of the disclosure, the predefined data type may be a request for switching the accessory mode of the electronic device 101.

The predefined data type may be a signal transmitted from the first external electronic device 102 to the electronic device 101 automatically without any intervention of the user when a predetermined application (for example, an application related to exercise) is executed in the first external electronic device 102.

The first external electronic device 102 may identify one or more profiles or services related to exercise data which can be used by the electronic device 101 and transmit data making a request for transmitting exercise data to the electronic device 101 through the first communication channel 201.

For example, the first external electronic device 102 may identify one or more profiles or services related to exercise data which can be used by the electronic device 101 and transmit information on data types corresponding to the one or more profiles or services related to exercise data which can be used to the electronic device 101.

The data making the request for establishing the second communication channel 202 may be, for example, out of band (OOB) data for the secure connection to the second communication channel 202. An out of band (OOB) pairing method may be a method of transmitting pairing information through an already connected channel other than the channel for the connection of paring information and perform pairing.

The first external electronic device 102 may transmit BLE out of band (OOB) data through the first communication channel 201 for the connection of the second communication channel 202. When receiving the out of band (OOB) data or the BLE out of band (OOB) data using the second communication channel 202, the electronic device 101 may be connected to the first external electronic device 102 through the communication using the second communication channel 202.

The first external electronic device 102 may make the communication connection with the electronic device 101, based on the second communication channel 202, according to the control of the processor (for example, the processor 120 of FIG. 1) in operation 507. The second communication channel 202 may be a BLE communication channel.

When receiving a predefined data type from the first external electronic device 102, the electronic device 101 may operate in an accessory mode (or peripheral mode) through the second communication channel 202 and transmit a signal including an advertisement packet. The signal including the advertisement packet may be a signal transmitted to all nearby devices without designating a specific device.

The first external electronic device 102 may receive or scan the signal including the advertisement packet transmitted from the electronic device 101 and may be connected to the electronic device 101 through communication using the second communication channel 202. The first external electronic device 102 may search for the electronic device 101 including a device ID received through reception or scanning of the signal including the advertisement packet and perform a pairing process after the second communication channel 202. At this time, the first external electronic device 102 may operate in a central mode.

The first external electronic device 102 may transmit a data transmission command to the electronic device 101, based on the second communication channel 202, according to the control of the processor (for example, the processor 120 of FIG. 1) in operation 509.

In an embodiment of the disclosure, the first external electronic device 102 may transmit a data transmission command and/or user data to the electronic device 101, based on the second communication channel 202, according to the control of the processor (for example, the processor 120 of FIG. 1) in operation 509.

In an embodiment of the disclosure, the first external electronic device 102 may transmit a data transmission command, user data, and/or a control command to the electronic device 101, based on the second communication channel 202, according to the control of the processor (for example, the processor 120 of FIG. 1) in operation 509.

The data transmission commands may include information on programs (or applications) related to exercise. The information on the programs (or applications) related to exercise may be included in the data transmission commands and may be transmitted separately from the data transmission commands.

The first external electronic device 102 may receive exercise data, based on the second communication channel 202, according to the control of the processor (for example, the processor 120 of FIG. 1) in operation 511.

In an embodiment of the disclosure, the first external electronic device 102 may receive exercise data and/or the control command, based on the second communication channel 202, according to the control of the processor (for example, the processor 120 of FIG. 1) in operation 511.

In an embodiment of the disclosure, when receiving exercise data, based on the second communication channel 202, according to the control of the processor (for example, the processor 120 of FIG. 1) in operation 511, the first external electronic device 102 may generate exercise summary data. The exercise data is data acquired during exercise, such as a heart rate or calories, and the exercise summary data may be data obtained by calculating, collecting, and combining exercise data such as a heart rate or calories.

In an embodiment of the disclosure, the exercise summary data may be data obtained by combining information calculated and collected by the first external electronic device 102, based on the exercise data received from the electronic device 102. The first external electronic device 102 may synchronize the exercise summary data, based on a user account of the server 108 and/or the second external electronic device 103. The electronic device 101 may receive the exercise summary data synchronized with the server 108 and/or the second external electronic device 103, combine and synchronize the exercise summary data, and store the same in the memory 130. In an embodiment, the first external electronic device 102 may synchronize the exercise summary data with the electronic device 101. The electronic device 101 may receive the exercise summary data synchronized with the first external electronic device 102, combine and synchronize the exercise summary data, and store the same in the memory 130.

The first external electronic device 102 may display exercise data on a display module (for example, the display module 160 of FIG. 1) according to the control of the processor (for example, the processor 120 of FIG. 1) in operation 513.

In an embodiment of the disclosure, the first external electronic device 102 may display exercise summary data on a display module (for example, the display module 160 of FIG. 1) according to the control of the processor (for example, the processor 120 of FIG. 1) in operation 513. The exercise summary data may be data obtained by combining information calculated and collected by the external electronic device 102, based on the exercise data received from the electronic device 101.

In an embodiment of the disclosure, the first external electronic device 102 may display the exercise data and a program (or application) related to exercise being executed together on the display module (for example, the display module 160 of FIG. 1) according to the control of the processor (for example, the processor 120 of FIG. 1) in operation 513.

The program (or application) related to exercise being executed may configure a screen, based on the exercise data and display the screen on the display module (for example, the display module 160 of FIG. 1).

At this time, the exercise data may be configured by a separate user interface and may be displayed to be overlaid with the program (or application) related to exercise being executed. For example, the user interface may be an exercise summary information screen.

The first external electronic device 102 may determine whether there is a control command according to the control of the processor (for example, the processor 120 of FIG. 1) in operation 515.

When there is no control command, the first external electronic device 102 may perform a function currently executed in the first external electronic device 102 according to the control of the processor (for example, the processor 120 of FIG. 1) in operation 515.

When there is a control command, the first external electronic device 102 may proceed to operation 517 from operation 515.

The first external electronic device 102 may control the operation of the first external electronic device 102 according to the control command or transmit the control command to the electronic device 101, based on the second communication channel 202 according to the control of the processor (for example, the processor 120 of FIG. 1) in operation 517.

In an embodiment of the disclosure, when the control command is the request for stopping the accessory mode, the first external electronic device 102 may stop the connection of the second communication channel 202 and perform control to synchronize exercise data with the electronic device 101, the second external electronic device 103, or the server 108 according to the control of the processor (for example, the processor 120 of FIG. 1) in operation 517.

In an embodiment of the disclosure, when the control command is the request for stopping the accessory mode, the first external electronic device 102 may stop the connection of the second communication channel 202 and perform control to synchronize exercise summary data with the electronic device 101, the second external electronic device 103, or the server 108 according to the control of the processor (for example, the processor 120 of FIG. 1) in operation 517. The control command is a control command for an operation state of a program (or application) related to exercise and may include start, resume, pause, stop, close, and/or go operations of the program (or application) related to exercise.

The program (or application) related to exercise may be executed in the first external electronic device 102 and may make a request for transmitting exercise data related to the program (or application) related to the exercise.

The control command may be selected through an input of the user of the first external electronic device 102, received from the electronic device 101 through the second communication channel 202, or generated when a call event from the electronic device 101 and/or the first external electronic device 102 is made and/or ends.

The user input may be, for example, an input through an input module (for example, the input module 150 of FIG. 1) of the first external electronic device 102 and/or a touch input through a touch sensor of a display module (for example, the display module 160 of FIG. 1).

When a call event is generated (received and/or originated) through the communication module 190, the electronic device 101 and/or the first external electronic device 102 may generate a control command for pausing exercise data measurement and/or transmission.

When the call event ends through the communication module 190, the electronic device 101 and/or the first external electronic device 102 may generate a control command for resuming exercise data measurement and/or transmission.

The first external electronic device 102 may receive a control command, based on a user input made through the input module (for example, the input module 150) according to the control of the processor (for example, the processor 120 of FIG. 1).

The first external electronic device 102 may receive a control command, based on a touch input made through the touch sensor of the display module (for example, the display module 160) according to the control of the processor (for example, the processor 120 of FIG. 1).

In an embodiment of the disclosure, the first external electronic device 102 may receive a control command, based on a user input made through a remote control device (for example, a remote controller) according to the control of the processor (for example, the processor 120 of FIG. 1).

Figure 6:
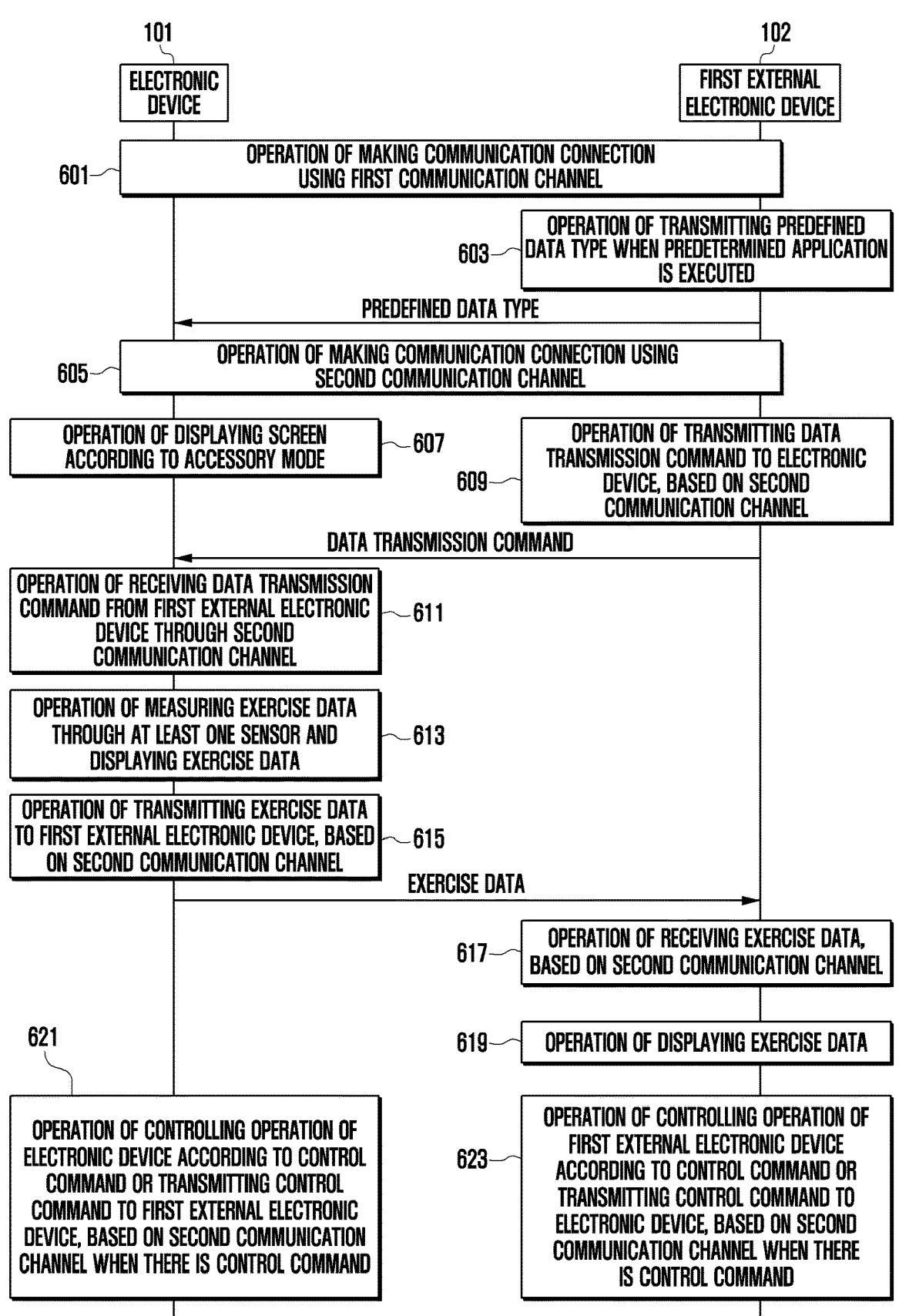
FIG. 6 is a flowchart illustrating a method of providing exercise data between the electronic device and the first external electronic device according to an embodiment of the disclosure.

FIG. 6 is a flowchart illustrating a method of providing exercise data between the electronic device 101 and the first external electronic device 102 according to an embodiment of the disclosure.

The electronic device 101 and the first external electronic device 102 may make the communication connection based on the first communication channel 201 in operation 601.

In an embodiment of the disclosure, when the electronic device 101 has been already connected to the first external electronic device 102 through communication, based on the first communication channel 201, operation 601 may be omitted.

When the predetermined application is executed according to the control of the processor (for example, the processor 120 of FIG. 1), the first external electronic device 102 may transmit a predefined data type to the electronic device 101 through the first communication channel 201 in operation 603.

In an embodiment of the disclosure, the first external electronic device 102 may first perform operation 603 before operation 601 according to the control of the processor 120. After determining whether a predetermined application is executed in operation 603, the first external electronic device 102 may make the communication connection with the electronic device 101, based on the first communication channel 201.

When the predetermined application is executed according to the control of the processor (for example, the processor 120 of FIG. 1), the first external electronic device 102 may be in an idle state for the second communication connection after transmitting a predefined data type to the electronic device 101 through the first communication channel 201 in operation 603.

The electronic device 101 and the first external electronic device 102 may be connected through communication based on the second communication channel 202 in operation 605. The second communication channel 202 may be a BLE communication channel.

When receiving a predefined data type from the first external electronic device 102, the electronic device 101 may operate in an accessory mode (or peripheral mode) through the second communication channel 202 and transmit a signal including an advertisement packet. The signal including the advertisement packet may be a signal transmitted to all nearby devices without designating a specific device.

The first external electronic device 102 may receive or scan the signal including the advertisement packet transmitted from the electronic device 101 and may be connected to the electronic device 101 through communication using the second communication channel 202. The first external electronic device 102 may search for the electronic device 101 including a device ID received through reception or scanning of the signal including the advertisement packet and perform a pairing process after the second communication channel 202. At this time, the first external electronic device 102 may operate in a central mode.

The electronic device 101 may display a screen on the display module 160 according to the accessory mode (or peripheral mode) according to the control of the processor 120 in operation 607.

The electronic device 101 may display a user interface indicating the operation of the accessory mode (or peripheral mode) on the display module 160 according to the control of the processor 120 in operation 607.

For example, the user interface indicating the operation in the accessory mode (or peripheral mode) may be text or an icon.

For example, the user interface indicating the operation in the accessory mode (or peripheral mode) may be a user interface having information displaying on the screen being smaller than that of a normal mode or a simplified user interface.

In an embodiment, the electronic device 101 may first perform operation 605 before operation 607 according to the control of the processor 120. The electronic device 101 may perform operation 607, based on reception of the predefined data type from the first external electronic device 102 in operation 603.

The first external electronic device 102 may transmit a data transmission command to the electronic device 101, based on the second communication channel 202, according to the control of the processor (for example, the processor 120 of FIG. 1) in operation 609.

In an embodiment of the disclosure, the first external electronic device 102 may transmit a data transmission command and/or user data to the electronic device 101, based on the second communication channel 202, according to the control of the processor (for example, the processor 120 of FIG. 1) in operation 609.

In an embodiment of the disclosure, the first external electronic device 102 may transmit a data transmission command, user data, and/or a control command to the electronic device 101, based on the second communication channel 202, according to the control of the processor (for example, the processor 120 of FIG. 1) in operation 609.

The data transmission commands may include information on programs (or applications) related to exercise. The information on the programs (or applications) related to exercise may be included in the data transmission commands and may be transmitted separately from the data transmission commands.

The electronic device 101 may receive a data transmission command from the first external electronic device 102 through the second communication channel 202 according to the control of the processor 120 in operation 611.

In an embodiment of the disclosure, the electronic device 101 may receive a data transmission command and/or user data from the first external electronic device 102 through the second communication channel 202 according to the control of the processor 120 in operation 611.

In an embodiment of the disclosure, the electronic device 101 may receive a data transmission command, user data, and/or a control command from the first external electronic device 102 through the second communication channel 202 according to the control of the processor 120 in operation 611.

The electronic device 101 may measure exercise through one or more sensors included in the sensor module 176 and display the exercise data on the display module 160 according to the control of the processor 120 in operation 613.

The electronic device 101 may measure exercise data through one or more sensors included in the sensor module 176, based on user data and display the exercise data on the display module 160 according to the control of the processor 120 in operation 613.

In an embodiment of the disclosure, the electronic device 101 may measure exercise through one or more sensors included in the sensor module 176, based on user data and display the exercise data on the display module 160 according to the control of the processor 120 in operation 613.

The user data may be, for example, data received from the first external electronic device 102. The user data may be, for example, data pre-stored in the memory 130 of the electronic device 101.

The user data may be information on a user's age or body information such as a height or weight of the user.

In an embodiment of the disclosure, the electronic device 101 may reconfigure one or more profiles or services related to exercise data according to a predefined data type transmitted by the first external electronic device 102 and measure and/or collect exercise data through one or more sensors, based on the one or more reconfigured profiles or services related to exercise data according to the control of the processor 120 in operation 613.

The electronic device 101 may transmit the collected and/or measured exercise data to the first external electronic device 102, based on the second communication channel 202 according to the control of the processor 120 in operation 615.

The electronic device 101 may transmit collected and/or measured exercise and/or a control command to the first external electronic device 102, based on the second communication channel 202, according to the control of the processor 120 in operation 615.

The first external electronic device 102 may receive exercise data, based on the second communication channel 202, according to the control of the processor (for example, the processor 120 of FIG. 1) in operation 617.

In an embodiment of the disclosure, when receiving exercise data, based on the second communication channel 202, according to the control of the processor (for example, the processor 120 of FIG. 1) in operation 617, the first external electronic device 102 may generate exercise summary data. The exercise data is data acquired during exercise such as a heart rate or calories, and the exercise summary data may be data obtained by collecting and combining data (for example, average heart rate, total calories burned) calculated based on the acquired exercise data.

In an embodiment of the disclosure, the exercise summary data may be data obtained by combining information calculated and collected by the first external electronic device 102, based on the exercise data received from the electronic device 101. The first external electronic device 102 may synchronize the exercise summary data, based on a user account of the server 108 and/or the second external electronic device 103. The electronic device 101 may receive the exercise summary data synchronized with the server 108 and/or the second external electronic device 103, combine and synchronize the exercise summary data, and store the same in the memory 130. In an embodiment, the first external electronic device 102 may synchronize the exercise summary data with the electronic device 101. The electronic device 101 may receive the exercise summary data synchronized with the first external electronic device 102, combine and synchronize the exercise summary data, and store the same in the memory 130.

The first external electronic device 102 may display exercise data on a display module (for example, the display module 160 of FIG. 1) according to the control of the processor (for example, the processor 120 of FIG. 1) in operation 619.

In an embodiment of the disclosure, the first external electronic device 102 may display exercise summary data on a display module (for example, the display module 160 of FIG. 1) according to the control of the processor (for example, the processor 120 of FIG. 1) in operation 619. The exercise summary data may be data obtained by combining information calculated and collected by the external electronic device 102, based on the exercise data received from the electronic device 101.

When there is a control command, the electronic device 101 may control the operation of the electronic device 101 according to the control command or transmit the control command to the first external electronic device 102, based on the second communication channel 202 according to the control of the processor 120 in operation 621.

When there is a control command, the first external electronic device 102 may control the operation of the first external electronic device 102 according to the control command or transmit the control command to the electronic device 101, based on the second communication channel 202, according to the control of the processor (for example, the processor 120 of FIG. 1) in operation 623.

FIG. 7 is a flowchart illustrating a method of providing exercise data by the electronic device 101 according to an embodiment of the disclosure.

At least some of the operations illustrated in FIG. 7 may be omitted. Before or after at least some operations illustrated in FIG. 4, at least some operations described with reference to other drawings may be additionally inserted into the disclosure. The operations illustrated in FIG. 7 may be performed by the processor 120. For example, the memory 130 of the electronic device 101 may store instructions causing the processor 120, when executed, to perform at least some operations illustrated in FIG. 7.

The electronic device 101 may make the communication connection with the first external electronic device 102, based on the first communication channel 201 according to the control of the processor 120 in operation 701. The first communication channel 201 may be, for example, a short-range communication (for example, Bluetooth (BT) or WiFi) channel.

In an embodiment of the disclosure, when the electronic device 101 has been already connected to the second external electronic device 103 through communication, based on the first communication channel 201, operation 701 may be omitted.

The second external electronic device 103 is a device including a display module (for example, the display module 160 of FIG. 1) and may be an electronic device such as a smartphone, a tablet, a TV, or a set-top box.

In an embodiment of the disclosure, the electronic device 101 may be a fitness tracker, the first external electronic device 102 is a device including a display module (for example, the display module 160 of FIG. 1) and may be an electronic device such as TV or a set-top box, and the second external electronic device 103 may be a smartphone.

The electronic device 101 and the second external electronic device 103 may be connected through communication using the first communication channel 201, and the first external electronic device 102 and the second external electronic device 103 may be connected through communication using the first communication channel 201.

In an embodiment of the disclosure, the first external electronic device 102 and the second external electronic device 103 may be devices registered in the server 108, based on the same user account. The server 108 may collect and store information for the communication connection of registered devices such as the first external electronic device 102 and the second external electronic device 103. The information for the communication connection of the registered devices may be stored not only in the server 108 but also in the second external electronic device 103. When the server 108 receives the exercise data transmission request or the predefined data type related to the exercise data transmission request from the first external electronic device 102, the server 108 may transmit the exercise data transmission request or the predefined data type related to the exercise data transmission request to the second external electronic device 103. When the second external electronic device 103 receives the exercise data transmission request or the predefined data type related to the exercise data transmission request from the server 108, the second external electronic device 103 may transmit the exercise data transmission request or the predefined data type related to the exercise data transmission request to the electronic device 101 through the first communication channel 201 according to the control of the processor (for example, the processor 120 of FIG. 1).

The electronic device 101 may determine whether a predefined data type is received from the second external electronic device 103 through the first communication channel 201 according to the control of the processor 120 in operation 703. For example, as an application or a program related to exercise is executed in the first external electronic device 102, the electronic device 101 may determine whether a predefined data type is received from the second external electronic device 103.

The predefined data type which the electronic device 101 receives from the second external electronic device 103 may be data which the first external electronic device 102 transmits to the second external electronic device 103 through the first communication channel 201. The second external electronic device 103 may perform an operation in which the first external electronic device 102 and/or the server 108 relays the predefined data type to the electronic device 101.

When the predefined data type is not received from the second external electronic device 103 through the first communication channel 201, the electronic device 101 may perform a function currently executed in the electronic device 101 according to the control of the processor 120.

When the predefined data type is received from the second external electronic device 103 through the first communication channel 201, the electronic device 101 may proceed to operation 705 from operation 703.

The predefined data type may be data making a request for transmitting exercise data and/or data making a request for establishing the second communication channel 202.

In an embodiment of the disclosure, the predefined data type may be a request for switching the accessory mode of the electronic device 101.

When a predetermined application (for example, application related to exercise) is executed in the first external electronic device 102, the predefined data type may be a signal which is transmitted from the first external electronic device 102 to the second external electronic device 103 automatically without any intervention of the user.

The first external electronic device 102 may identify one or more profiles or services related to exercise data which can be used by the electronic device 101 and transmit data making a request for transmitting exercise data to the second external electronic device 103 through the first communication channel 201.

For example, the first external electronic device 102 may identify one or more profiles or services related to exercise data which can be used by the electronic device 101 and transmit information on data types corresponding to the one or more profiles or services related to exercise data which can be used to the second external electronic device 103.

The data making the request for establishing the second communication channel 202 may be, for example, out of band (OOB) data for the secure connection to the second communication channel 202. An out of band (OOB) pairing method may be a method of transmitting pairing information through an already connected channel other than the channel for the connection of pairing information and perform pairing.

The first external electronic device 102 may transmit BLE out of band (OOB) data through the first communication channel 201 for the connection of the second communication channel 202. When receiving the out of band (OOB) data or the BLE out of band (OOB) data using the second communication channel 202, the electronic device 101 may be connected to the first external electronic device 102 through the communication using the second communication channel 202.

The electronic device 101 may make the communication connection with the first external electronic device 102, based on the second communication channel 202 according to the control of the processor 120 in operation 705.

When receiving a predefined data type from the first external electronic device 102 according to the control of the processor 120 in operation 705, the electronic device 101 may operate in an accessory mode (or peripheral mode) through the second communication channel 202 and transmit a signal including an advertisement packet. The signal including the advertisement packet may be a signal transmitted to all nearby devices without designating a specific device.

The first external electronic device 102 may receive or scan the signal including the advertisement packet transmitted from the electronic device 101 and may be connected to the electronic device 101 through communication using the second communication channel 202. The first external electronic device 102 may search for the electronic device 101 including a device ID received through reception or scanning of the signal including the advertisement packet and perform a pairing process after the second communication channel 202. At this time, the first external electronic device 102 may operate in a central mode.

The electronic device 101 may display a screen on the display module 160 according to the accessory mode (or peripheral mode) according to the control of the processor 120 in operation 707.

The electronic device 101 may display a user interface indicating the operation of the accessory mode (or peripheral mode) on the display module 160 according to the control of the processor 120 in operation 707. For example, the user interface may be an exercise summary information screen.

For example, the user interface indicating the operation in the accessory mode (or peripheral mode) may be text or an icon.

For example, the user interface indicating the operation in the accessory mode (or peripheral mode) may be a user interface having information displaying on the screen being smaller than that of a normal mode or a simplified user interface. The normal mode may be a state in which the electronic device 101 independently operates without operating in the peripheral mode of the first external electronic device 102.

In an embodiment of the disclosure, the electronic device 101 may first perform operation 707 before operation 705 according to the control of the processor 120. The electronic device 101 may perform operation 707, based on reception of the predefined data type from the first external electronic device 102 in operation 703.

The electronic device 101 may receive a data transmission command from the first external electronic device 102 through the second communication channel 202 according to the control of the processor 120 in operation 709.

In an embodiment of the disclosure, the electronic device 101 may receive a data transmission command and/or user data from the first external electronic device 102 through the second communication channel 202 according to the control of the processor 120 in operation 709.

In an embodiment of the disclosure, the electronic device 101 may receive a data transmission command, user data, and/or a control command from the first external electronic device 102 through the second communication channel 202 according to the control of the processor 120 in operation 709.

The electronic device 101 may collect and/or measure exercise data, based on activated services or characteristics, and transmit the exercise data to the first external electronic device 102, based on the second communication channel 202.

The data transmission commands may include information on programs (or applications) related to exercise. The information on the programs (or applications) related to exercise may be included in the data transmission commands and may be transmitted separately from the data transmission commands.

The electronic device 101 may measure exercise through one or more sensors included in the sensor module 176 and display the exercise data on the display module 160 according to the control of the processor 120 in operation 711.

The electronic device 101 may measure exercise data through one or more sensors included in the sensor module 176, based on user data and display the exercise data on the display module 160 according to the control of the processor 120 in operation 711.

In an embodiment of the disclosure, the electronic device 101 may measure exercise through one or more sensors included in the sensor module 176, based on user data and display the exercise data on the display module 160 according to the control of the processor 120 in operation 711.

The electronic device 101 may not combine the exercise data with other exercise data and/or exercise summary data stored in the memory 130 according to the control of the processor 120 in operation 711.

In an embodiment of the disclosure, the electronic device 101 may reconfigure one or more profiles or services related to exercise data according to a predefined data type transmitted by the first external electronic device 102 and measure and/or collect exercise data through one or more sensors, based on the one or more reconfigured profiles or services related to exercise data according to the control of the processor 120 in operation 711.

The electronic device 101 may transmit the collected and/or measured exercise data to the first external electronic device 102, based on the second communication channel 202 according to the control of the processor 120 in operation 713.

In an embodiment, the electronic device 101 may transmit collected and/or measured exercise data and/or a control command to the first external electronic device 102, based on the second communication channel 202, according to the control of the processor 120 in operation 713.

The electronic device 101 may determine whether there is a control command according to the control of the processor 120 in operation 715.

When there is no control command, the electronic device 101 may perform a function currently executed in the electronic device 101 according to the control of the processor 120.

When there is a control command, the electronic device 101 may proceed to operation 715 from operation 717.

The electronic device 101 may control the operation of the electronic device 101 according to the control command or transmit the control command to the first external electronic device 102, based on the second communication channel 202, according to the control of the processor 120 in operation 717.

In an embodiment, when the control command is a request for stopping the accessory mode, the electronic device 101 may stop the connection of the second communication channel 202 and perform control to synchronize exercise data with the first external electronic device 102, the second external electronic device 103, or the server 108 according to the control of the processor 120 in operation 717.

In an embodiment of the disclosure, when the control command is a request for stopping the accessory mode, the electronic device 101 may stop the connection of the second communication channel 202 and perform control to synchronize exercise summary data with the first external electronic device 102, the second external electronic device 103, or the server 108 according to the control of the processor 120 in operation 717.

The control command is a control command for an operation state of a program (or application) related to exercise and may include start, resume, pause, stop, close, and/or go operations of the program (or application) related to exercise.

The program (or application) related to exercise may be executed in the first external electronic device 102 and may make a request for transmitting exercise data related to the program (or application) related to the exercise.

The control command may be selected through an input of the user of the electronic device 101, received from the first external electronic device 102 through the second communication channel 202, or generated when a call event is made and/or ends from the electronic device 101 and/or the first external electronic device 102.

The user input may be an input through the input module 150 of the electronic device 101 and/or a touch input through a touch sensor of the display module 160.

When the call event is made (received and/or originated) through the communication module 190, the electronic device 101 and/or the first external electronic device 102 may generate a control command for measuring exercise data and/or pausing transmission.

When the call event ends through the communication module 190, the electronic device 101 and/or the first external electronic device 102 may generate a control command for measuring exercise data and/or resuming transmission.

In an embodiment of the disclosure, even though a call event is generated (received and/or originated) through the communication module 190, the electronic device 101 and/or the second external electronic device 103 may continue exercise data measurement and/or transmission.

In an embodiment of the disclosure, when the call event is generated (received and/or originated) through the communication module 190, the electronic device 101 and/or the first external electronic device 102 may ask the user about whether to execute the control command for pausing or resuming exercise data measurement and/or transmission. For example, when the call event is generated (received and/or originated) through the communication module 190, the electronic device 101 and/or the first external electronic device 102 may display a user interface indicating whether to execute the control command for pausing or continuing exercise data measurement and/or transmission on the display module 160.

In an embodiment of the disclosure, when the call event is generated (received and/or originated) through the communication module 190, the electronic device 101 and/or the first external electronic device 102 may preset the command for stopping or continuing exercise data measurement and/or transmission. For example, when the call event is generated (received and/or originated) through the communication module 190, the electronic device 101 and/or the first external electronic device 102 may display a user interface for pre-configuring the command for stopping or continuing exercise data measurement and/or transmission on the display module 160 and pre-store the command in the memory 130.

Figure 8:
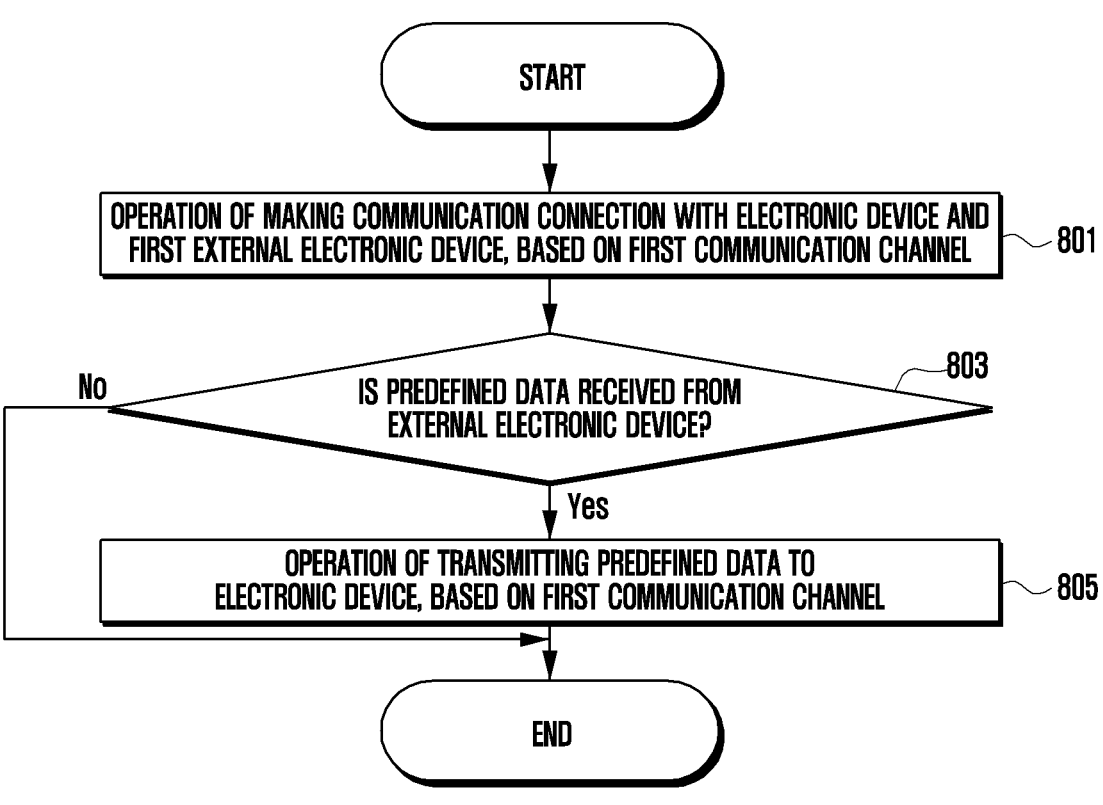
FIG. 8 is a flowchart illustrating an operation in which the second external electronic device receives a predefined data type from the first external electronic device and transmits the same to the electronic device according to an embodiment of the disclosure.

FIG. 8 is a flowchart illustrating an operation in which the second external electronic device 103 receives a predefined data type from the first external electronic device 102 and transmits the same to the electronic device 101 according to an embodiment of the disclosure.

The first external electronic device 102 may make a communication connection with the first external electronic device 102, based on the first communication channel 201, according to the control of a processor (for example, the processor 120 of FIG. 1) in operation 801. The first communication channel 201 may be, for example, a short-range communication (for example, Bluetooth (BT) or WiFi) channel.

The second external electronic device 103 may determine whether the predefined data type is received from an external electronic device (for example, the first external electronic device 102, or the server 108) according to the control of the processor (for example, the processor 120 of FIG. 1) in operation 803.

When the predefined data types is not received, the second external electronic device 103 may perform a function currently executed in the second external electronic device 103 according to the control of the processor (for example, the processor 120 of FIG. 1) in operation 803.

When the predefined data type is received from the first external electronic device 102, the second external electronic device 103 may proceed to operation 805 from operation 803.

The second external electronic device 103 may transmit the predefined data type received from the external electronic device (for example, the first external electronic device 102 or the server 108) to the electronic device 101, based on the first communication channel 201, according to the control of the processor (for example, the processor 120 of FIG. 1) in operation 805.

FIG. 9 is a flowchart illustrating a method by which the first external electronic device 102 establishes the second communication channel 202 with the electronic device 101 through the second external electronic device 103 and receives exercise data from the electronic device 101 according to an embodiment of the disclosure.

The first external electronic device 102 may make a communication connection with an external electronic device (for example, the second external electronic device 103 or the server 108) according to the control of a processor (for example, the processor 120 of FIG. 1) in operation 901.

In an embodiment of the disclosure, the first external electronic device 102 and the second external electronic device 103 may be devices registered in the server 108, based on the same user account. The server 108 may collect and store information (for example, a device ID) for the communication connection of registered devices such as the first external electronic device 102 and the second external electronic device 103. The information for the communication connection of the registered devices may be stored not only in the server 108 but also in the second external electronic device 103. When the server 108 receives the exercise data transmission request or the predefined data type related to the exercise data transmission request from the first external electronic device 102, the server 108 may transmit the exercise data transmission request or the predefined data type related to the exercise data transmission request to the second external electronic device 103. When the second external electronic device 103 receives the exercise data transmission request or the predefined data type related to the exercise data transmission request from the server 108, the second external electronic device 103 may transmit the exercise data transmission request or the predefined data type related to the exercise data transmission request to the electronic device 101 through the first communication channel 201 according to the control of the processor (for example, the processor 120 of FIG. 1).

In an embodiment of the disclosure, the first external electronic device 102 may make the communication connection with the second external electronic device 103, based on the first communication channel 201, according to the control of the processor (for example, the processor 120 of FIG. 1) in operation 901.

The first communication channel 201 may be, for example, a short-range communication (for example, Bluetooth (BT) or WiFi) channel.

In an embodiment of the disclosure, the first external electronic device 102 may first perform operation 903 before operation 901 according to the control of the processor 120. After determining whether a predetermined application is executed in operation 903, the first external electronic device 102 may make the communication connection with the external electronic device (for example, the second external electronic device 103 or the server 108).

In an embodiment of the disclosure, when the first external electronic device 102 has been already connected to the external electronic device (for example, the second external electronic device 103 or the server 108) through communication, operation 901 may be omitted.

The first external electronic device 102 may determine whether a predetermined application is executed according to the control of the processor (for example, the processor 120 of FIG. 1) in operation 903.

When the predetermined application is not executed, the first external electronic device 102 may perform a function currently executed in the first external electronic device 102 according to the control of the processor (for example, the processor 120 of FIG. 1).

When the predetermined application is executed, the first external electronic device 102 may proceed to operation 905 from operation 903.

The predetermined application is an application requiring exercise data, for example, a program (or application) related to exercise.

When the predetermined application is executed, the first external electronic device 102 may transmit a predefined data type to the second external electronic device 103 through the first communication channel 201 according to the control of the processor (for example, the processor 120 of FIG. 1) in operation 905.

In an embodiment of the disclosure, when a predetermined application is executed, the first external electronic device 102 may make a request for establishing the second communication channel 202 to the electronic device 101 through the second external electronic device 103 according to the control of the processor (for example, the processor 120 of FIG. 1) in operation 905.

The predefined data type may be data making a request for transmitting exercise data and/or data making a request for establishing the second communication channel 202.

In an embodiment, the predefined data type may be a request for switching the accessory mode of the electronic device 101.

When the predetermined application (for example, application related to exercise) is executed in the first external electronic device 102, the predefined data type may be a signal transmitted from the first external electronic device 102 to the second external electronic device 103 automatically without any intervention of the user.

The first external electronic device 102 may identify one or more profiles or services related to exercise data which can be used by the electronic device 101 and transmit data making a request for transmitting exercise data to the electronic device 101 through the first communication channel 201.

For example, the first external electronic device 102 may identify one or more profiles or services related to exercise data which can be used by the electronic device 101 and transmit information on a data type corresponding to the one or more profiles or services related to the exercise data which can be used to the electronic device 101.

The data making the request for establishing the second communication channel 202 may be, for example, out of band (OOB) data for the secure connection to the second communication channel 202. An out of band (OOB) pairing method may be a method of transmitting pairing information through an already connected channel other than the channel for the connection of pairing information and perform pairing.

The first external electronic device 102 may transmit BLE out of band (OOB) data through the first communication channel 201 for the connection of the second communication channel 202. When receiving BLE out of band (OOB) data using the second communication channel 202 through the second external electronic device 103, the electronic device 101 may be connected to the first external electronic device 102 through communication using the second communication channel 202.

The first external electronic device 102 may make the communication connection with the electronic device 101, based on the second communication channel 202, according to the control of the processor (for example, the processor 120 of FIG. 1) in operation 907. The second communication channel 202 may be a BLE communication channel.

When receiving a predefined data type from the first external electronic device 102, the electronic device 101 may operate in an accessory mode (or peripheral mode) through the second communication channel 202 and transmit a signal including an advertisement packet. The signal including the advertisement packet may be a signal transmitted to all nearby devices without designating a specific device.

The first external electronic device 102 may receive or scan the signal including the advertisement packet transmitted from the electronic device 101 and may be connected to the electronic device 101 through communication using the second communication channel 202. The first external electronic device 102 may search for the electronic device 101 including a device ID received through reception or scanning of the signal including the advertisement packet and perform a pairing process after the second communication channel 202. At this time, the first external electronic device 102 may operate in a central mode.

The first external electronic device 102 may transmit a data transmission command to the electronic device 101, based on the second communication channel 202, according to the control of the processor (for example, the processor 120 of FIG. 1) in operation 909.

In an embodiment of the disclosure, the first external electronic device 102 may transmit a data transmission command and/or user data to the electronic device 101, based on the second communication channel 202, according to the control of the processor (for example, the processor 120 of FIG. 1) in operation 909.

In an embodiment of the disclosure, the first external electronic device 102 may transmit a data transmission command, user data, and/or a control command to the electronic device 101, based on the second communication channel 202, according to the control of the processor (for example, the processor 120 of FIG. 1) in operation 909.

The data transmission commands may include information on programs (or applications) related to exercise. The information on the programs (or applications) related to exercise may be included in the data transmission commands and may be transmitted separately from the data transmission commands.

The first external electronic device 102 may receive exercise data, based on the second communication channel 202, according to the control of the processor (for example, the processor 120 of FIG. 1) in operation 911.

In an embodiment of the disclosure, the first external electronic device 102 may receive exercise data and/or the control command, based on the second communication channel 202, according to the control of the processor (for example, the processor 120 of FIG. 1) in operation 911.

In an embodiment of the disclosure, when receiving exercise data, based on the second communication channel 202, according to the control of the processor (for example, the processor 120 of FIG. 1) in operation 911, the first external electronic device 102 may generate exercise summary data. The exercise data is data acquired during exercise, such as a heart rate or calories, and may be data obtained by calculating, collecting, and combining exercise data such as a heart rate or calories.

In an embodiment of the disclosure, the exercise summary data may be data obtained by combining information calculated and collected by the first external electronic device 102, based on the exercise data received from the electronic device 101. The first external electronic device 102 may synchronize the exercise summary data, based on a user account of the server 108 and/or the second external electronic device 103. The electronic device 101 may receive the exercise summary data synchronized with the server 108 and/or the second external electronic device 103, combine and synchronize the exercise summary data, and store the same in the memory 130. In an embodiment, the first external electronic device 102 may synchronize the exercise abstract data with the electronic device 101. The electronic device 101 may receive the exercise summary data synchronized with the first external electronic device 102, combine and synchronize the exercise summary data, and store the same in the memory 130.

The first external electronic device 102 may display exercise data on a display module (for example, the display module 160 of FIG. 1) according to the control of the processor (for example, the processor 120 of FIG. 1) in operation 913.

In an embodiment of the disclosure, the first external electronic device 102 may display exercise summary data on a display module (for example, the display module 160 of FIG. 1) according to the control of the processor (for example, the processor 120 of FIG. 1) in operation 913. The exercise summary data may be data obtained by combining information calculated and collected by the external electronic device 102, based on the exercise data received from the electronic device 101.

In an embodiment of the disclosure, the first external electronic device 102 may display the exercise data and a program (or application) related to exercise being executed together on the display module (for example, the display module 160 of FIG. 1) according to the control of the processor (for example, the processor 120 of FIG. 1) in operation 913.

The program (or application) related to exercise being executed may configure a screen, based on the exercise data and display the screen on the display module (for example, the display module 160 of FIG. 1).

At this time, the exercise data may be configured by a separate user interface and may be displayed to be overlaid with the program (or application) related to exercise being executed. For example, the user interface may be an exercise summary information screen.

The first external electronic device 102 may determine whether there is a control command according to the control of the processor (for example, the processor 120 of FIG. 1) in operation 915.

When there is no control command, the first external electronic device 102 may perform a function currently executed in the first external electronic device 102 according to the control of the processor (for example, the processor 120 of FIG. 1) in operation 915.

When there is a control command, the first external electronic device 102 may proceed to operation 917 from operation 915.

The first external electronic device 102 may control the operation of the first external electronic device 102 according to the control command or transmit the control command to the electronic device 101, based on the second communication channel 202, according to the control of the processor (for example, the processor 120 of FIG. 1) in operation 917.

In an embodiment of the disclosure, when the control command is the request for stopping the accessory mode, the first external electronic device 102 may stop the connection of the second communication channel 202 and perform control to synchronize exercise data with the electronic device 101, the second external electronic device 103, or the server 108 according to the control of the processor (for example, the processor 120 of FIG. 1) in operation 917.

In an embodiment of the disclosure, when the control command is the request for stopping the accessory mode, the first external electronic device 102 may stop the connection of the second communication channel 202 and perform control to synchronize exercise summary data with the electronic device 101, the second external electronic device 103, or the server 108 according to the control of the processor (for example, the processor 120 of FIG. 1) in operation 917.

The control command is a control command for an operation state of a program (or application) related to exercise and may include start, resume, pause, stop, close, and/or go operations of the program (or application) related to exercise.

The program (or application) related to exercise may be executed in the first external electronic device 102 and may make a request for transmitting exercise data related to the program (or application) related to the exercise.

The control command may be selected through an input of the user of the first external electronic device 102, received from the electronic device 101 through the second communication channel 202, or generated when a call event from the electronic device 101 and/or the first external electronic device 102 is made and/or ends.

The user input may be, for example, an input through an input module (for example, the input module 150 of FIG. 1) of the first external electronic device 102 and/or a touch input through a touch sensor of a display module (for example, the display module 160 of FIG. 1).

When the call event is made (received and/or originated) through the communication module 190, the electronic device 101 and/or the first external electronic device 102 may generate a control command for measuring exercise data and/or pausing transmission.

When the call event ends through the communication module 190, the electronic device 101 and/or the first external electronic device 102 may generate a control command for measuring exercise data and/or resuming transmission.

In an embodiment of the disclosure, even though a call event is generated (received and/or originated) through the communication module 190, the electronic device 101 and/or the second external electronic device 103 may continue exercise data measurement and/or transmission.

In an embodiment of the disclosure, when the call event is generated (received and/or originated) through the communication module 190, the electronic device 101 and/or the first external electronic device 102 may ask the user about whether to execute the control command for pausing or resuming exercise data measurement and/or transmission. For example, when the call event is generated (received and/or originated) through the communication module 190, the electronic device 101 and/or the first external electronic device 102 may display a user interface indicating whether to execute the control command for pausing or continuing exercise data measurement and/or transmission on the display module 160.

In an embodiment of the disclosure, when the call event is generated (received and/or originated) through the communication module 190, the electronic device 101 and/or the first external electronic device 102 may preset the command for stopping or continuing exercise data measurement and/or transmission. For example, when the call event is generated (received and/or originated) through the communication module 190, the electronic device 101 and/or the first external electronic device 102 may display a user interface for pre-configuring the command for stopping or continuing exercise data measurement and/or transmission on the display module 160 and pre-store the command in the memory 130.

The first external electronic device 102 may receive a control command, based on a user input made through the input module (for example, the input module 150) according to the control of the processor (for example, the processor 120 of FIG. 1).

The first external electronic device 102 may receive a control command, based on a touch input made through the touch sensor of the display module (for example, the display module 160) according to the control of the processor (for example, the processor 120 of FIG. 1).

In an embodiment of the disclosure, the first external electronic device 102 may receive a control command, based on a user input made through a remote control device (for example, a remote controller) according to the control of the processor (for example, the processor 120 of FIG. 1).

Figure 10:
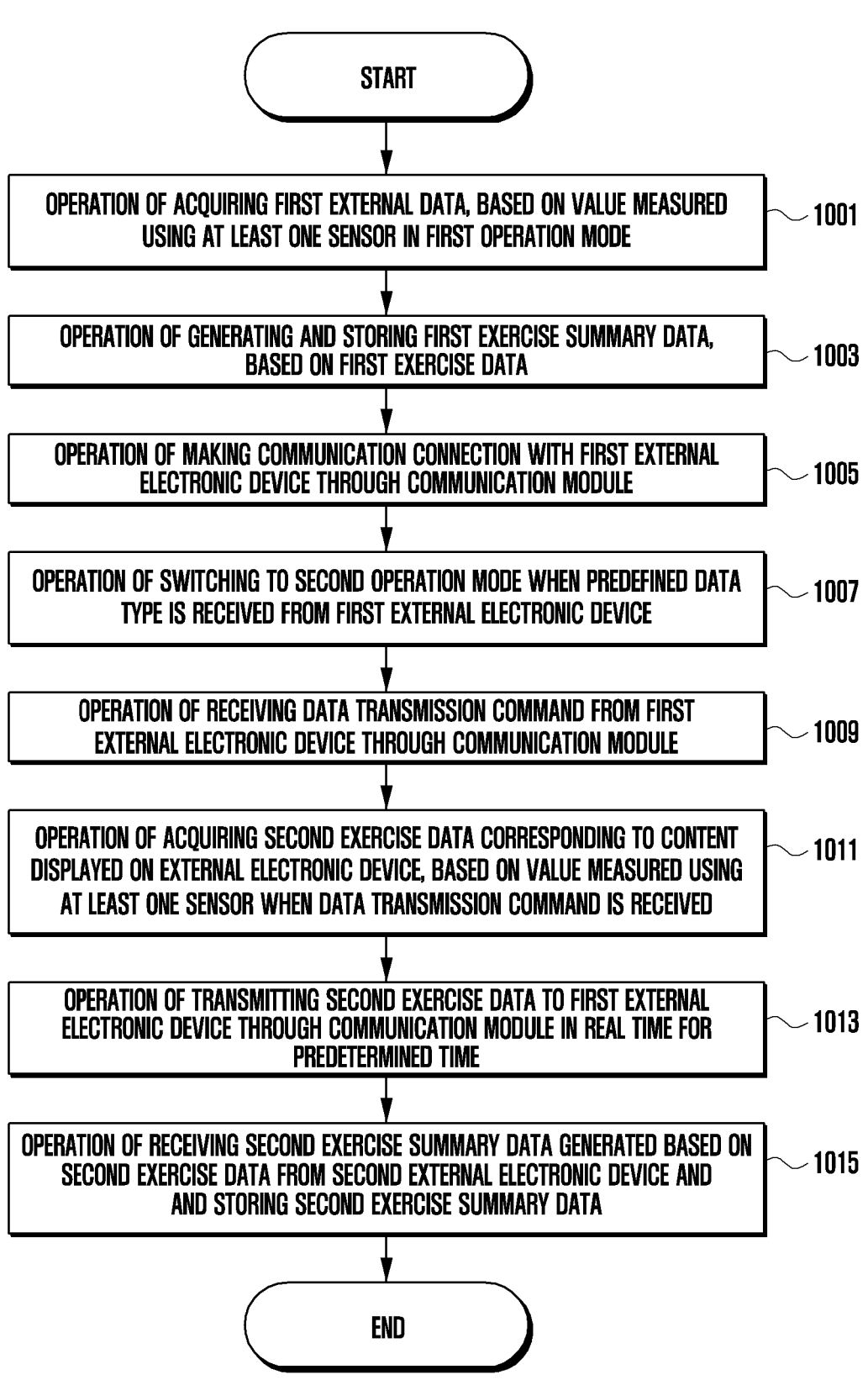
FIG. 10 is a flowchart illustrating a method of providing exercise data by the electronic device according to an embodiment of the disclosure.

FIG. 10 is a flowchart illustrating a method of providing exercise data by the electronic device 101 according to an embodiment of the disclosure.

The electronic device 101 may acquire first exercise data, based on a value measured using one or more sensors in a first operation mode, according to the control of the processor 120 in operation 1001. The first operation mode may be, for example, a normal mode. The normal mode may be a state in which the electronic device 101 independently operates without operating in the peripheral mode of the first external electronic device 102. In the normal mode, the electronic device 101 may generate exercise summary data after termination of exercise based on exercise data without any synchronization with the external device, and store the same together with the existing exercise summary data.

The electronic device 101 may generate first exercise summary data, based on the first exercise data and store the same in the memory 130 in the first operation mode according to the control of the processor 120 in operation 1003.

The first exercise data may be data acquired and calculated when the user exercises based on one more sensors included in the electronic device 101. The first exercise summary data may be data obtained by combining information calculated and collected based on the first exercise data. The electronic device 101 may acquire and/or calculate the first exercise summary data, based on the first exercise data, and store the same in the memory 130.

The electronic device 101 may make the communication connection with the first external electronic device 102 through the communication module 190 according to the control of the processor 120 in operation 1005. The electronic device 101 may make the communication connection with the first external electronic device 102 through the communication module 190 using the first communication channel 201 according to the control of the processor 120 in operation 1005.

When receiving a predefined data type from the first external electronic device 102, the electronic device 101 may switch to a second operation mode according to the control of the processor 120 in operation 1007.

In an embodiment of the disclosure, when receiving the predefined data type from the first external electronic device 102, the electronic device 101 may switch to the second operation mode, based on the second communication channel 202, according to the control of the processor 120 in operation 1007.

In an embodiment of the disclosure, when receiving the predefined data type from the first external electronic device 102 after making the communication connection using the first communication channel 201, the electronic device 101 may make the communication connection with the first external electronic device 102 by using the second communication channel 202 according to the control of the processor 120 in operation 1007.

The first communication channel 201 may be, for example, WiFi, near field communication (NFC), ultra-wideband (UWB), or Bluetooth, and the second communication channel 202 may be a BLE communication channel.

As an application or a program related to exercise is executed in the first external electronic device 102, the electronic device 101 may determine whether to receive the predefined data type from the first external electronic device 102.

The second operation mode may be an accessory mode. In the accessory mode, when exercise summary data is not received from the external electronic device (for example, the server 108, the first external electronic device 102, or the second external electronic device 103) even though exercise is terminated, the electronic device 101 cannot store the same with the existing exercise summary data.

The electronic device 101 may receive a data transmission command from the first external electronic device 102 through the communication module 190 according to the control of the processor 120 in operation 1009.

When receiving the data transmission command according to the control of the processor 120, the electronic device 101 may acquire second exercise data corresponding to content displayed on the external electronic device, based on a value measured through one or more sensors in operation 1011.

The electronic device 101 may transmit the second exercise data to the first external electronic device 102 in real time for a predetermined time through the communication module 190 according to the control of the processor 120 in operation 1013.

The electronic device 101 may receive second exercise summary data generated based on the second exercise data from the second external electronic device 103 through the communication module 190 and store the received second exercise summary data in the memory 130 according to the control of the processor 120 in operation 1015.

The second exercise data is data acquired and calculated when the user exercises based on one or more sensors included in the electronic device 101 and may be data transferred to the first external electronic device 102. The second exercise summary data may be data obtained by combining information calculated and collected by the first external electronic device 102, based on the second exercise data received from the electronic device 101. The first external electronic device 102 may synchronize the second exercise summary data, based on a user account of the server 108 and/or the second external electronic device 103. The electronic device 101 may receive the second exercise summary data synchronized with the server 108 and/or the second external electronic device 103, combine and synchronize the exercise summary data, and store the same in the memory 130. In an embodiment, the first external electronic device 102 may synchronize the second exercise summary data with the electronic device 101. The electronic device 101 may receive the second exercise summary data synchronized with the first external electronic device 102, combine and synchronize the exercise summary data, and store the same in the memory 130.

Figure 11:
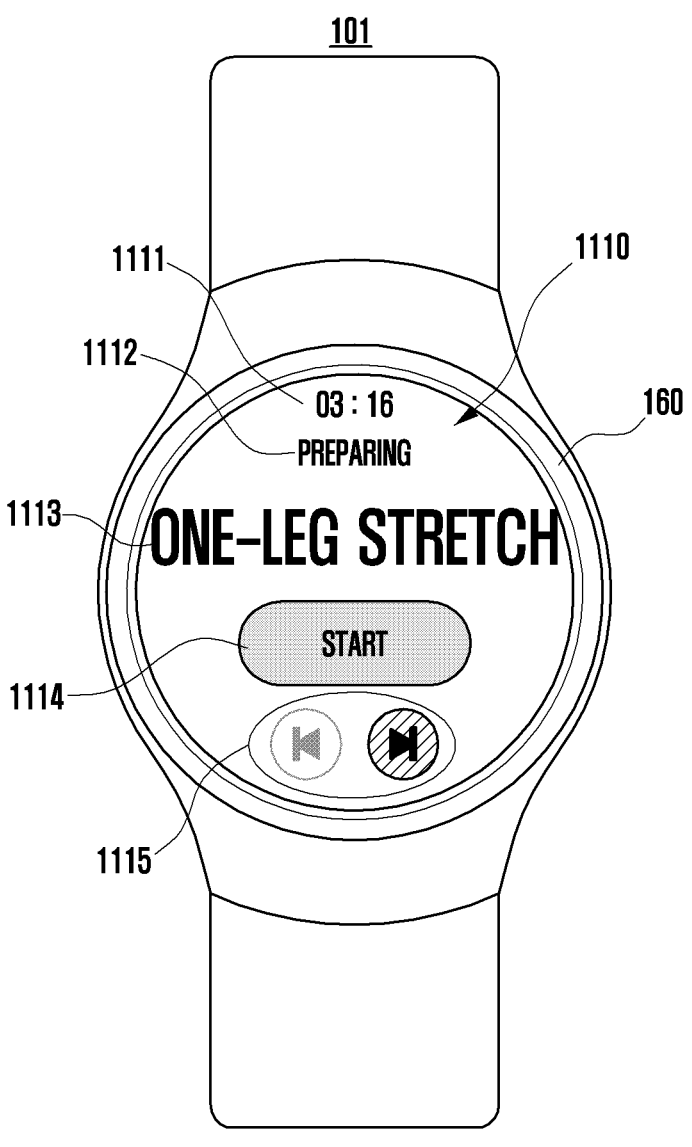
FIG. 11 illustrates an exercise summary information screen displayed on a display module when the electronic device operates in an accessory mode according to an embodiment of the disclosure.

FIG. 11 illustrates an exercise summary information screen 1110 displayed on the display module 160 when the electronic device 101 operates in the accessory mode according to an embodiment of the disclosure.

The electronic device 101 may display the exercise summary information screen 1110 related to the accessory mode on the display module 160 while operating in the accessory mode.

The electronic device of FIG. 11 may be before exercise data collection and/or measurement after switching from the normal mode to the accessory mode. The exercise summary information screen 1110 related to the accessory mode in FIG. 11 may show a user interface in the state before exercise data collection and/or measurement after the electronic device 101 enters the accessory mode. The exercise summary information screen 1110 related to the accessory mode may include clock information 1111, information 1112 on an exercise state or exercise duration, information 1113 on an exercise type, information 1114 on an exercise state, and/or a control interface 1115 for a control command.

For example, the clock information 1111 of FIG. 11 may be displayed as '3:16' corresponding to the current time. The information 1112 on the exercise state or exercise duration of FIG. 11 may be displayed as 'prepared'. The information 1113 on the exercise type of FIG. 11 may be displayed as 'one-leg stretch'. The information 1114 on the exercise state of FIG. 11 may be displayed as 'start'. The control interface 1115 for the control command of FIG. 11 may include a button for selecting previous exercise or next exercise.

Figure 12:
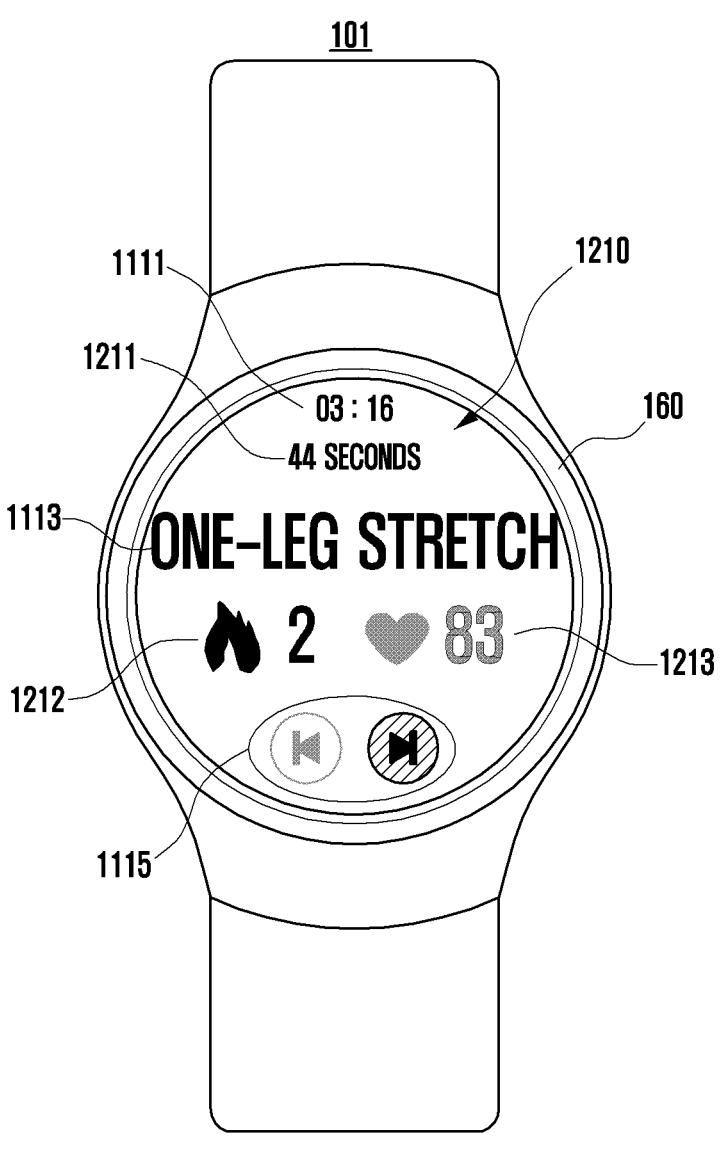
FIG. 12 illustrates an exercise summary information screen displayed on a display module when the electronic device operates in an accessory mode according to an embodiment of the disclosure.

FIG. 12 illustrates an exercise summary information screen 1210 displayed on the display module 160 when the electronic device 101 operates in the accessory mode according to an embodiment of the disclosure.

The electronic device 101 may display the exercise summary information screen 1210 related to the accessory mode on the display module 160 while operating in the accessory mode.

The electronic device 101 of FIG. 12 may collect and/or measure exercise data in the accessory mode. The exercise summary information screen 1210 related to the accessory mode may be an exercise summary information in the state of the electronic device 101 after the exercise data is collected and/or measured in the accessory mode.

The exercise summary information screen 1210 related to the accessory mode may include clock information 1111, information 1211 on an exercise state or a quantity of exercise content, information 1113 on an exercise type, information 1212 on calories consumed by exercise, information 1213 on a heart rate, and/or a control interface 1115 for a control command.

For example, the clock information 1111 of FIG. 12 may be displayed as "3:16" corresponding to the current time. The information 1211 on the exercise state or the quantity of the exercise content of FIG. 12 may be displayed as '44 seconds'. The information 1113 on the exercise type of FIG. 12 may be displayed as 'one-leg stretch'. The information 1212 on calories consumed by exercise of FIG. 12 may be displayed as '2'. The information 1213 on the heart rate of FIG. 12 may be displayed as '83'. The control interface 1115 for the control command of FIG. 12 may include a button for selecting previous exercise or next exercise.

Figure 13:
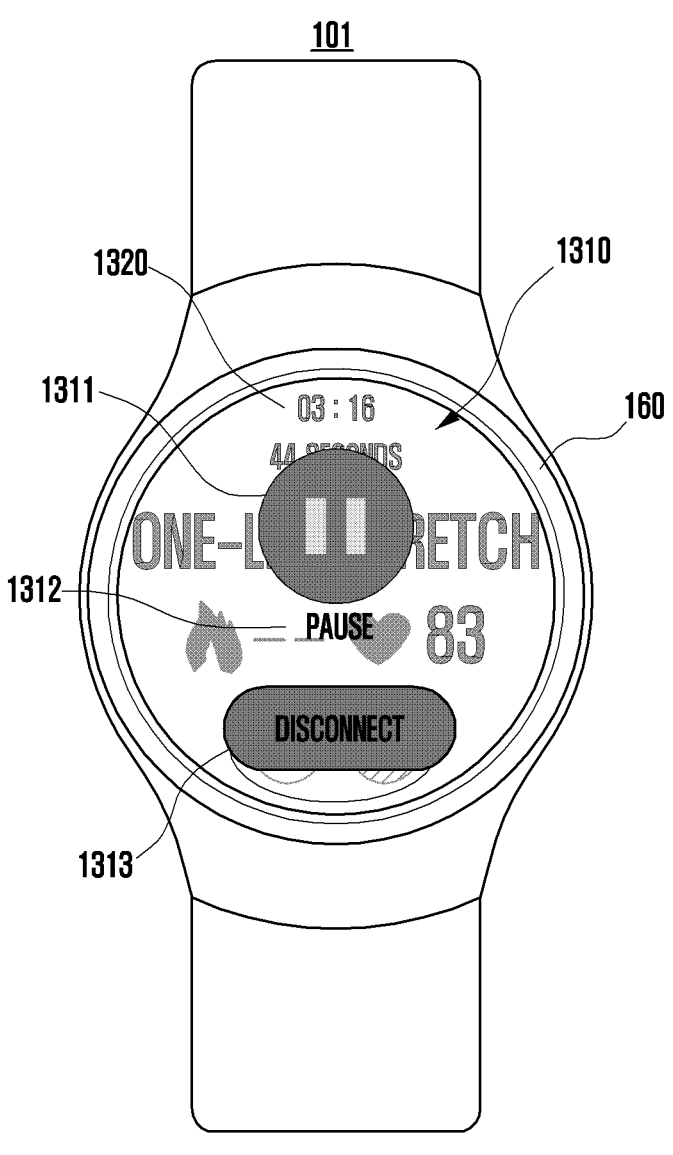
FIG. 13 illustrates an exercise summary information screen displayed on a display module when the electronic device operates in the accessory mode according to an embodiment of the disclosure.

FIG. 13 illustrates an exercise summary information screen 1310 displayed on the display module 160 when the electronic device 101 pauses in the accessory mode according to an embodiment of the disclosure.

The electronic device 101 may display the exercise summary information screen 1310 related to the accessory mode on the display module 160 while operating in the accessory mode.

The electronic device 101 of FIG. 13 may be in an operation state according to a control command (for example, pause) while collecting exercise data in the accessory mode. The exercise summary information screen 1310 related to the accessory mode of FIG. 13 may be an exercise summary information screen according to a control command (for example, pause) while the electronic device 101 collects exercise data in the accessory mode.

The exercise summary information screen 1310 related to the accessory mode may include a background interface 1320 including an exercise summary information screen before the operation according to the control command, information 1311 or 1312 on the operation state according to the control command, and/or a control interface 1313 for the control command.

For example, the background interface 1320 including the exercise summary information screen before the operation according to the control command of FIG. 13 may be translucently or faintly displayed. The information 1311 or 1312 on the operation state according to the control command in FIG. 13 may be displayed as a pause icon or pause text. The control interface 1313 for the control command of FIG. 13 may display 'disconnection' between the electronic device 101 and the first external electronic device 102. The control interface 1313 for the control command of FIG. 13 may include a button for 'disconnection' between the electronic device 101 and the first external electronic device 102.

The exercise summary information screens 1110, 1210, and 1310 of FIGS. 11 to 13 may switch therebetween by a user input through the input module 150 of the electronic device 101.

Referring to FIGS. 11 to 13, the electronic device 101 may perform the following operation during the accessory mode. The electronic device 101 may execute a BLE GATT server to provide specific BLE services to an external device. The electronic device 101 may advertise execution of the corresponding service to an external device (for example, the first external electronic device 102). The electronic device 101 may exercise data provided by each service to an external device (for example, the first external electronic device 102) in real time and control the same. The electronic device 101 may not store exercise data during the accessory mode. The exercise data may be stored in a device (for example, the first external electronic device 102) having an external display, and the corresponding data may be synchronized with the electronic device 101 through a separate method such as the server 108 after termination of exercise. When the connection with the external device (for example, the first external electronic device 102) is made, the electronic device 101 may switch to a simple user interface indicating the operation in the accessory mode.

The exercise summary information screens 1110, 1210, and 1310 of FIGS. 11 to 13 may be user interface displaying information generated based on exercise data and/or exercise summary data on the display module 160.

Figure 14:
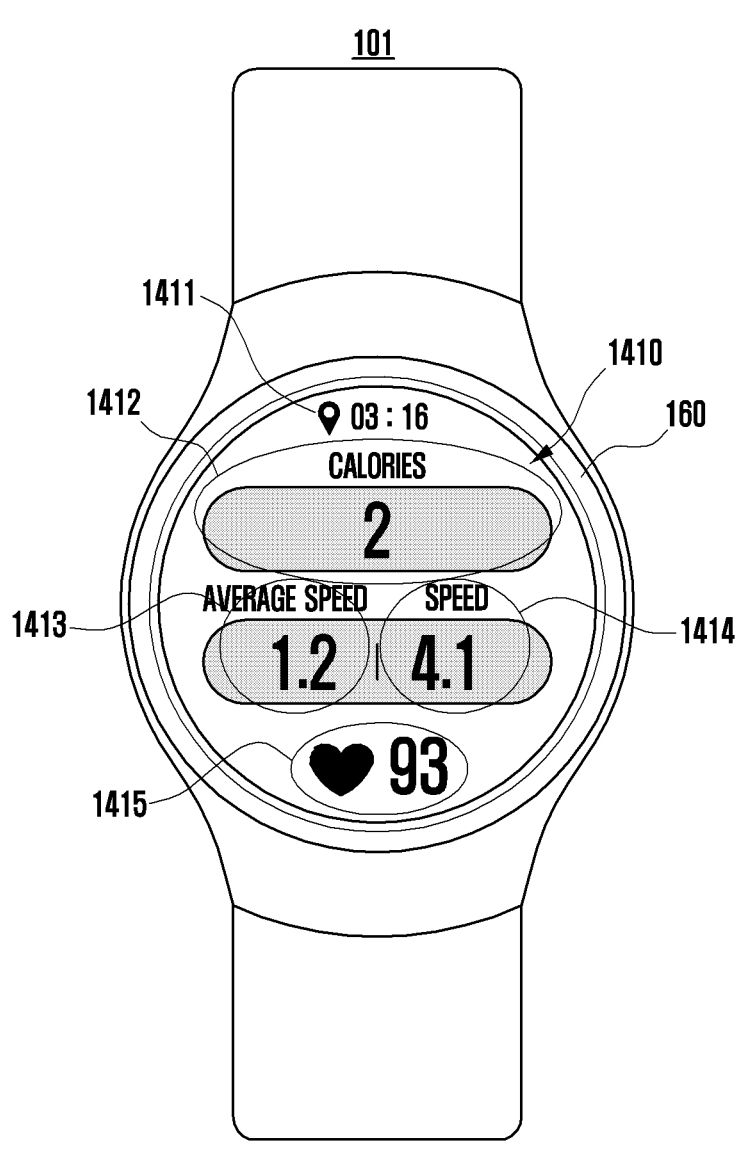
FIG. 14 illustrates an exercise summary information screen displayed on a display module when the electronic device operates in a normal mode according to an embodiment of the disclosure.

FIG. 14 illustrates an exercise summary information screen 1410 displayed on the display module 160 when the electronic device 101 operates in the normal mode according to an embodiment of the disclosure.

The electronic device 101 may display the exercise summary information screen 1410 related to the accessory mode on the display module 160 during the normal mode.

The electronic device 101 of FIG. 14 may collect and/or measure exercise data in the normal mode. The exercise summary information screen 1410 related to the normal mode may be an exercise summary information screen after the electronic device 101 collects and/or measures exercise data in the normal mode.

The exercise summary information screen 1410 related to the normal mode may include clock information 1411, information 1412 on calories consumed by exercise, information 1413 on an average speed, information 1414 on an instant speed, information 1114 on an exercise state, and/or information 1415 on a heart rate.

For example, the clock information 1411 of FIG. 14 may be displayed as "3:16" corresponding to the current time. The information 1412 on calories consumed by exercise of FIG. 14 may be displayed as 'calories 2'. The information 1413 on the average speed of FIG. 14 may be displayed as 'average speed 1.2'. The information 1414 on the instant speed of FIG. 14 may be displayed as 'speed 4.1'. The information 1415 on the heart rate of FIG. 14 may be displayed as '93'.

Figure 15:
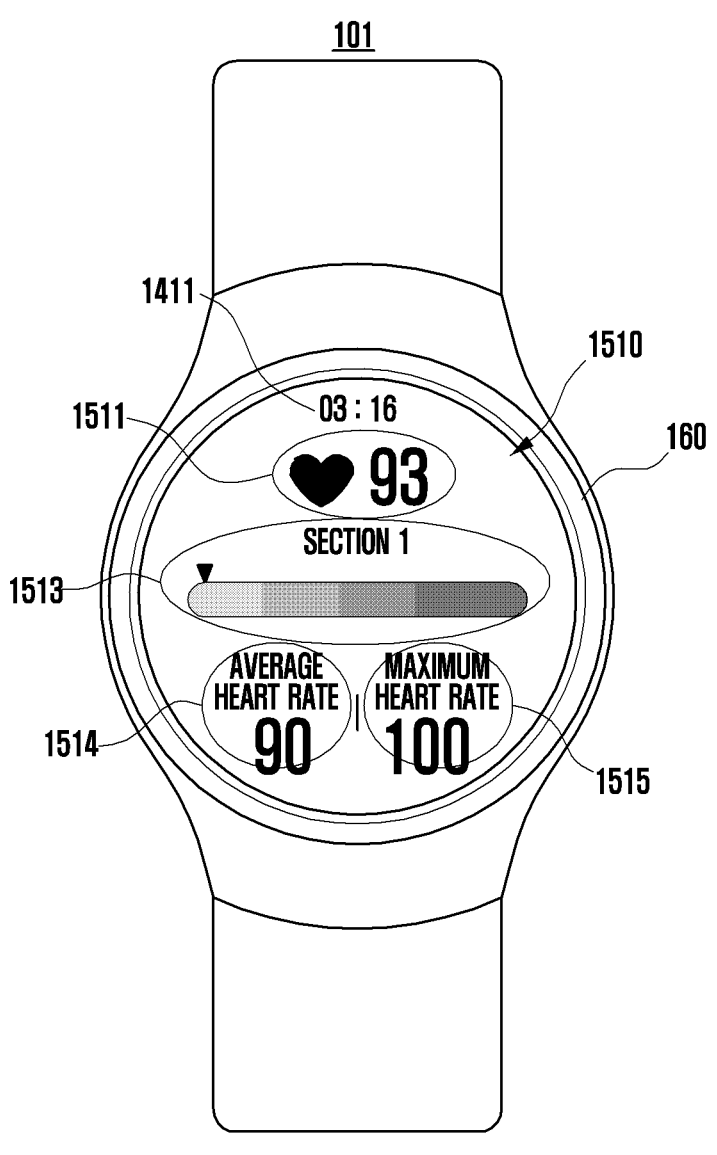
FIG. 15 illustrates an exercise summary information screen displayed on a display module when the electronic device operates in a normal mode according to an embodiment of the disclosure.

FIG. 15 illustrates an exercise summary information screen 1510 displayed on the display module 160 when the electronic device 101 operates in the normal mode according to an embodiment of the disclosure.

The electronic device 101 may display the exercise summary information screen 1510 related to the accessory mode on the display module 160 during the normal mode.

The electronic device 101 of FIG. 15 may collect and/or measure exercise data in the normal mode. The exercise summary information screen 1510 related to the accessory mode in FIG. 15 may indicate an exercise summary information screen after the electronic device 101 collects and/or measures exercise data in the normal mode.

The exercise summary information screen 1510 related to the normal mode may include clock information 1411, information 1511 on a heart rate, information 1513 on pace, information 1514 on an average heart rate, and/or information 1515 on a maximum heart rate.

For example, the clock information 1411 in FIG. 15 may be displayed as "3:16" corresponding to the current time. The information 1511 on the heart rate of FIG. 15 may be displayed as '93'. The information 1513 on pace in FIG. 15 may be displayed as a progress bar for each section. The information 1514 on the average heart rate in FIG. 15 may be displayed as 'average heart rate 90'. The information 1515 on the maximum heart rate of FIG. 15 may be displayed as 'maximum heart rate 100'.

Figure 16:
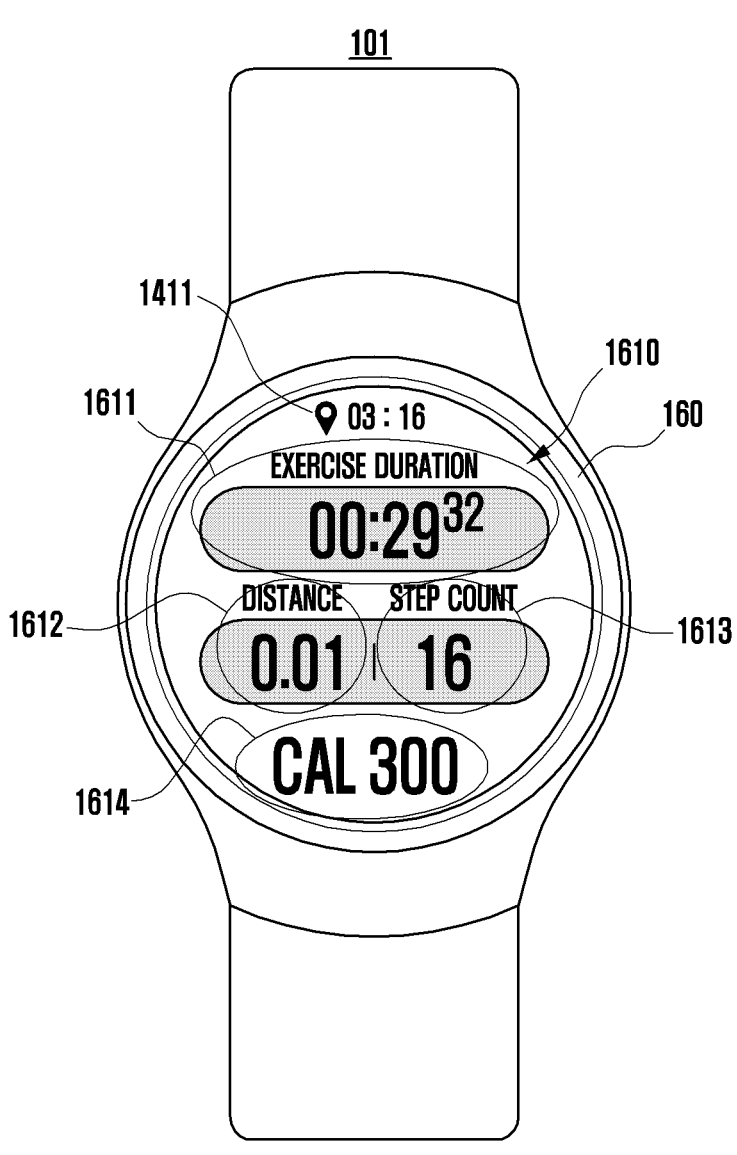
FIG. 16 illustrates an exercise summary information screen displayed on a display module when the electronic device operates in the normal mode according to an embodiment of the disclosure.

FIG. 16 illustrates an exercise summary information screen 1610 displayed on the display module 160 when the electronic device 101 operates in the normal mode according to an embodiment of the disclosure.

The electronic device 101 may display the exercise summary information screen 1610 related to the accessory mode on the display module 160 during the normal mode.

The electronic device 101 of FIG. 16 may collect and/or measure exercise data in the normal mode. The exercise summary information screen 1610 related to the accessory mode in FIG. 16 may indicate an exercise summary information screen after the electronic device 101 collects and/or measures exercise data in the normal mode.

The exercise summary information screen 1610 related to the normal mode may include clock information 1411, information 1611 on exercise duration, information 1612 on total distance, information 1613 on stride length, and/or information 1614 on total calories.

For example, the clock information 1411 of FIG. 16 may be displayed as '3:16'. The information 1611 on exercise duration of FIG. 16 may be displayed as 'exercise duration 00:2932. The information 1612 on total distance of FIG. 16 may be displayed as 'distance 0.01'. The information 1613 on stride length of FIG. 16 may be displayed as "step count 16'. The information 1614 on total calories of FIG. 16 may be displayed as '300'.

Referring to FIGS. 14 to 16, the electronic device 101 may measure heart rates 1415 and 1511 through a biometric sensor and calculate and display an average heart rate 1514 and a maximum heart rate 1515 by using the measured heart rate data. The electronic device 101 may calculate calories, based on the heart rate and calculate and display the exercise calories 1412 and the total calories 1614. For example, the exercise calories 1412 is calories used only when there is motion of the user during actual exercise, and the total calories 1614 is a sum of used calories even though there is no motion, and the total calories 1614 may be generally larger than the exercise calories 1412. In the normal mode, the electronic device 101 may generate exercise summary data after termination of exercise based on exercise data without any synchronization with the external device, and store the same with the existing exercise summary data. In the accessory mode, when exercise summary data is not received from the external electronic device (for example, the server 108, the first external electronic device 102, or the second external electronic device 103) even though exercise is terminated, the electronic device 101 cannot store the same with the existing exercise summary data.

The exercise summary information screens 1410, 1510, and 1610 of FIGS. 14 to 16 may switch therebetween by a user input through the input module 150 of the electronic device 101. The exercise summary information screens 1410, 1510, and 1610 of FIGS. 14 to 16 may be user interface displaying information generated based on exercise data and/or exercise summary data on the display module 160.

Figure 17:
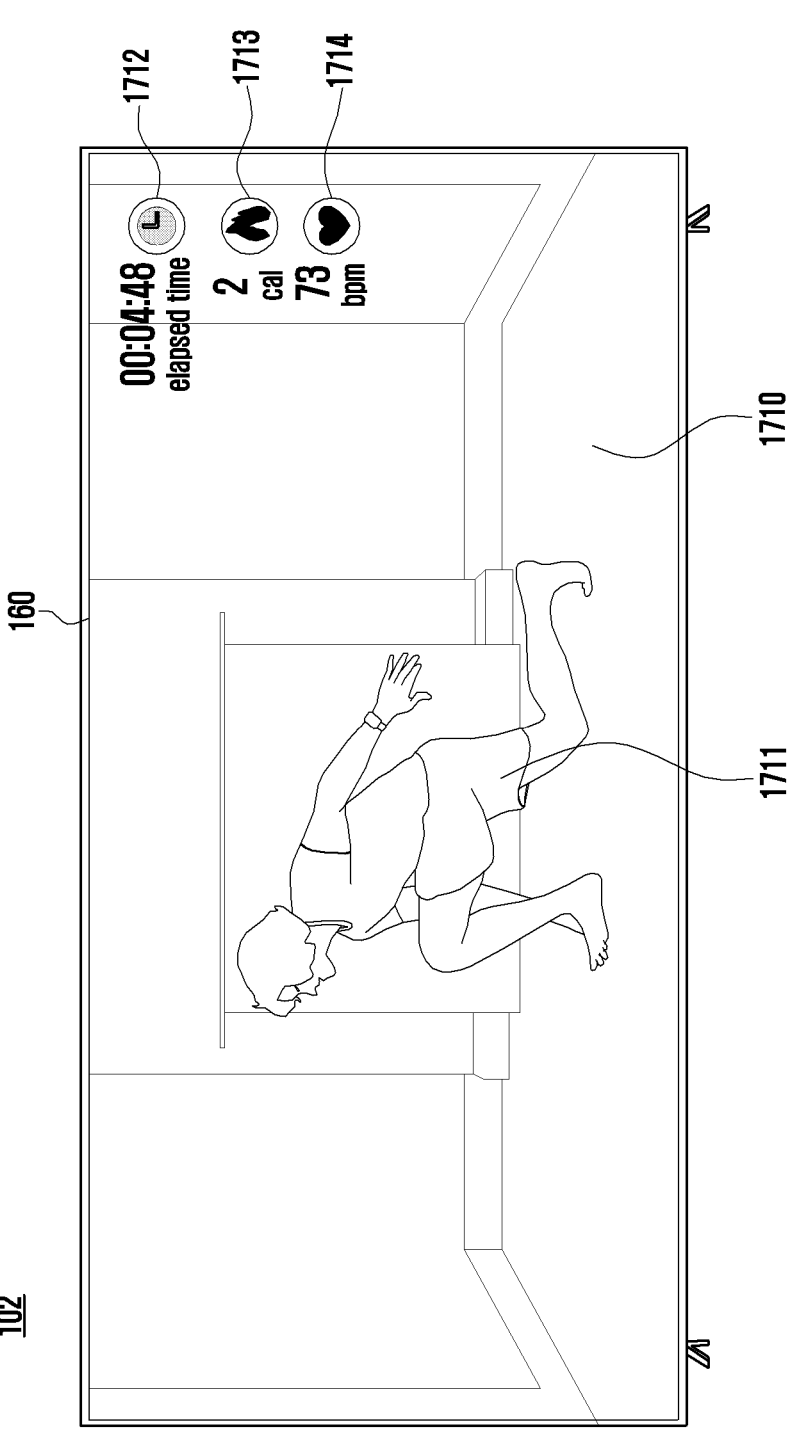
FIG. 17 illustrates an exercise summary information screen of the first external electronic device for displaying exercise data on the display module according to an embodiment of the disclosure.

FIG. 17 illustrates an exercise summary information screen 1710 of the first external electronic device 102 for displaying exercise data on the display module 160 according to an embodiment of the disclosure.

The exercise summary information screen 1710 for displaying the exercise data may include an execution screen 1711 of a program (or application) related to exercise and one or more pieces of exercise data information 1712, 1713, and 1714 displayed based on the exercise data received from the electronic device 101.

The one or more pieces of exercise data information 1712, 1713, and 1714 may include information 1712 on exercise duration, information 1712 on calories consumed by exercise, and information 1713 on a heart rate.

For example, the information 1712 on exercise duration of FIG. 17 may be displayed as 'elapsed time 00:04:48'. The information 1712 on calories burned by exercise in FIG. 17 may be displayed as 'cal 2'. The information 1813 on the heart rate of FIG. 17 may be displayed as 'bpm 73'.

The electronic device 101 according to an embodiment of the disclosure may include the display 160, at least one sensor (for example, the sensor module 176), communication circuit (such as communication module 190), one or more processors (such as processor 120), and memory (such as memory 130) storing one or more computer programs including computer-executable instructions that, when executed by the one or more processors, cause the electronic device to acquire first exercise data, based on a value measured using the at least one sensor (for example, the sensor module 176) in a first operation mode (for example, a normal mode), generate and store first exercise summary data, based on the first exercise data, make a communication connection with the first external electronic device 102 through the communication module 190, when a predefined data type is received from the first external electronic device 102, switch to a second operation mode (for example, an accessory mode), receive a data transmission command from the first external electronic device 102 through the communication module 190, when the data transmission command is received, acquire second exercise data corresponding to content displayed on a second external electronic device, based on the value measured using the at least one sensor (for example, the sensor module 176), transmit the second exercise data to the first external electronic device 102 through the communication module 190 in real time for a predetermined time, and receive second exercise summary data generated based on the second exercise data from the second external electronic device 103 and perform control to store the second exercise summary data.

According to an embodiment further of the disclosure the one or more computer programs further include computer-executable instructions to, when the predefined data type is received after the communication connection with the first external electronic device 102 is made, based on a first communication channel, make the communication connection with the first external electronic device 102, based on a second communication channel.

According to an embodiment of the disclosure the one or more computer programs further include computer-executable instructions to determine whether there is a control command and control an operation of the electronic device 101 according to the control command or perform control to transmit the control command to the first external electronic device 102.

The predefined data type according to an embodiment of the disclosure may be data making a request for transmitting the exercise data to the first external electronic device 102 or data making a request for establishing the second communication channel by the electronic device 101.

According to an embodiment of the disclosure the one or more computer programs further include computer-executable instructions to perform control to make a communication connection with the second external electronic device 103 and, when receiving the predefined data type from the second external electronic device 103, perform control to make the communication connection with the first external electronic device 102.

According to an embodiment of the disclosure the one or more computer programs further include computer-executable instructions to, when a control command for a request for stopping the second operation mode (for example, the accessory mode) is generated, perform control to stop the communication connection and synchronize exercise data and/or exercise summary data with the first external electronic device 102, the second external electronic device 103, or the server 108.

According to an embodiment of the disclosure the one or more computer programs further include computer-executable instructions to perform control to display a user interface on the display 160, based on the second operation mode (for example, the accessory mode).

According to an embodiment of the disclosure the one or more computer programs further include computer-executable instructions to, when the communication connection with the first external electronic device 102 is made, receive user data from the first external electronic device 102 and perform control to measure the second exercise data, based on the user data.

The first communication channel according to an embodiment of the disclosure may be a Bluetooth communication channel, the second communication channel may be a Bluetooth low energy (BLE) communication channel, and the processor 120 may transmit a BLE advertisement packet to make the communication connection with the first external electronic device 102 through the second communication channel.

The first external electronic device 102 and the second external electronic device 103 may be equal and managed based on a user account.

A method performed by an electronic device 101 for providing exercise data may include an operation of acquiring, by the electronic device 101, first exercise data, based on a value measured using at least one sensor (for example, the sensor module 176) in a first operation mode (for example, a normal mode), an operation of generating and storing, by the electronic device 101, first exercise summary data, based on the first exercise data, an operation of making, by the electronic device 101, a communication connection with a first external electronic device 102 through a communication module 190, an operation of, when a predefined data type is received from the first external electronic device 102, switching, by the electronic device 101, to a second operation mode (for example, an accessory mode), an operation of receiving, by the electronic device 101, a data transmission command from the first external electronic device 102 through the communication module 190, an operation of, when the data transmission command is received, acquiring, by the electronic device 101, second exercise data corresponding to content displayed on a second external electronic device, based on the value measured using the at least one sensor (for example, the sensor module 176), an operation of transmitting, by the electronic device 101, the second exercise data to the first external electronic device 102 through the communication module 190 in real time for a predetermined time, and an operation of receiving, by the electronic device 101, second exercise summary data generated based on the second exercise data from a second external electronic device 103 device and operating of storing, by the electronic device 101, the second exercise summary data.

The method of providing the exercise data by the electronic device 101 according to an embodiment of the disclosure may further include an operation of, when the predefined data type is received after the communication connection with the first external electronic device 102 is made, based on a first communication channel, making the communication connection with the first external electronic device 102, based on a second communication channel.

The method of providing the exercise data by the electronic device 101 according to an embodiment of the disclosure may further include an operation of determining whether there is a control command and an operation of controlling an operation of the electronic device 101 according to the control command or transmitting the control command to the first external electronic device 102.

The method of providing the exercise data by the electronic device 101 according to an embodiment of the disclosure may further include an operation of performing control to a communication connection with the second external electronic device 103 and an operation of, when a predefined data type is received from the second external electronic device 103, making the communication connection with the first external electronic device 102.

The method of providing the exercise data by the electronic device 101 according to an embodiment of the disclosure may further include an operation of, when a control command for a request for stopping the second operation mode (for example, the accessory mode) is generated, stopping the communication connection and synchronizing exercise data and/or exercise summary data with the first external electronic device 102, the second external electronic device 103, or a server 108.

The method of providing the exercise data by the electronic device 101 according to an embodiment of the disclosure may further include an operation of displaying a user interface on the electronic device 101, based on the second operation mode (for example, the accessory mode).

The method of providing the exercise data by the electronic device 101 according to an embodiment of the disclosure may further include an operation of, when the communication connection with the first external electronic device 102 is made, receiving user data from the first external electronic device 102 and an operation of measuring the second exercise data, based on the user data.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a display;

at least one sensor;

a communication circuit;

one or more processors; and memory storing one or more computer programs including computer-executable instructions that, when executed by the one or more processors, cause the electronic device to:

acquire first exercise data, based on a value measured using the at least one sensor in a first operation mode, generate and store first exercise summary data, based on the first exercise data, make a communication connection with a first external electronic device through the communication circuit, in case that a predefined data type is received from the first external electronic device, switch to a second operation mode, receive a data transmission command from the first external electronic device through the communication circuit, in case that the data transmission command is received, acquire second exercise data corresponding to content displayed on a second external electronic device, based on the value measured using the at least one sensor, transmit the second exercise data to the first external electronic device through the communication circuit in real time for a predetermined time, and receive second exercise summary data generated based on the second exercise data from the second external electronic device and perform control to store the second exercise summary data.

2. The electronic device of claim 1, wherein the one or more computer programs further include computer-executable instructions to, in case that the predefined data type is received after the communication connection with the first external electronic device is made, based on a first communication channel, make the communication connection with the first external electronic device, based on a second communication channel and control the communication circuit to transmit a BLE advertisement packet to make the communication connection with the first external electronic device through the second communication channel, wherein the predefined data type is data making a request for transmitting the second exercise data to the first external electronic device or data making a request for establishing the second communication channel by the electronic device, wherein the first communication channel is a Bluetooth communication channel, and wherein the second communication channel is a Bluetooth low energy (BLE) communication channel.

3. The electronic device of claim 1, wherein the one or more computer programs further include computer-executable instructions to:

determine whether there is a control command, and control an operation of the electronic device according to the control command or perform control to transmit the control command to the first external electronic device.

4. The electronic device of claim 1, wherein the one or more computer programs further include computer-executable instructions to:

perform control to make a communication connection with the second external electronic device, and in case that a predefined data type is received from the second external electronic device, perform control to make the communication connection with the first external electronic device.

5. The electronic device of claim 1, wherein the one or more computer programs further include computer-executable instructions to, in case that a control command for a request for stopping the second operation mode is generated, perform control to stop the communication connection and synchronize exercise data and/or exercise summary data with the first external electronic device, the second external electronic device, or a server.

6. The electronic device of claim 1, wherein the one or more computer programs further include computer-executable instructions to perform control to display a user interface on the display, based on the second operation mode.

7. The electronic device of claim 1, wherein the one or more computer programs further include computer-executable instructions to:

in case that the communication connection with the first external electronic device is made, receive user data from the first external electronic device, and perform control to measure the second exercise data, based on the user data.

8. The electronic device of claim 1, wherein the first external electronic device and the second external electronic device are equal and managed based on a user account.

9. A method performed by an electronic device for providing exercise data, the method comprising:

acquiring, by the electronic device, first exercise data, based on a value measured using at least one sensor in a first operation mode;

generating and storing, by the electronic device, first exercise summary data, based on the first exercise data;

making, by the electronic device, a communication connection with a first external electronic device through a communication circuit;

in case that a predefined data type is received from the first external electronic device, switching, by the electronic device, to a second operation mode;

receiving, by the electronic device, a data transmission command from the first external electronic device through the communication circuit;

in case that the data transmission command is received, acquiring, by the electronic device, second exercise data corresponding to content displayed on a second external electronic device, based on the value measured using the at least one sensor;

transmitting, by the electronic device, the second exercise data to the first external electronic device through the communication circuit in real time for a predetermined time; and receiving, by the electronic device, second exercise summary data generated based on the second exercise data from a second external electronic device and storing, by the electronic device, the second exercise summary data.

10. The method of claim 9, further comprising:

in case that the predefined data type is received after the communication connection with the first external electronic device is made, based on a first communication channel, making the communication connection with the first external electronic device, based on a second communication channel; and transmitting a BLE advertisement packet to make the communication connection with the first external electronic device through the second communication channel, wherein the predefined data type is data making a request for transmitting the second exercise data to the first external electronic device or data making a request for establishing the second communication channel by the electronic device, wherein the first communication channel is a Bluetooth communication channel, and wherein the second communication channel is a Bluetooth low energy (BLE) communication channel.

11. The method of claim 9, further comprising:

determining whether there is a control command; and controlling an operation of the electronic device according to the control command or transmitting the control command to the first external electronic device.

12. The method of claim 9, further comprising:

performing control to a communication connection with the second external electronic device; and in case that a predefined data type is received from the second external electronic device, making the communication connection with the first external electronic device.

13. The method of claim 9, further comprising:

in case that a control command for a request for stopping the second operation mode is generated, stopping the communication connection and synchronizing exercise data and/or exercise summary data with the first external electronic device, the second external electronic device, or a server.

14. The method of claim 9, further comprising:

displaying a user interface on the electronic device, based on the second operation mode.

15. The method of claim 9, further comprising:

in case that the communication connection with the first external electronic device is made, receiving user data from the first external electronic device; and measuring the second exercise data, based on the user data.

16. One or more non-transitory computer-readable storage media storing one or more computer programs including computer-executable instructions that, when executed by one or more processors of an electronic device, cause the electronic device to perform operations, the operations comprising:

acquiring first exercise data, based on a value measured using at least one sensor in a first operation mode;

generating and storing first exercise summary data, based on the first exercise data;

making a communication connection with a first external electronic device through a communication circuit;

in case that a predefined data type is received from the first external electronic device, switching to a second operation mode;

receiving a data transmission command from the first external electronic device through the communication circuit;

in case that the data transmission command is received, acquiring second exercise data corresponding to content displayed on an external electronic device, based on the value measured using the at least one sensor;

transmitting the second exercise data to the first external electronic device through the communication circuit in real time for a predetermined time; and receiving second exercise summary data generated based on the second exercise data from a second external electronic device and storing the second exercise summary data.

17. The one or more non-transitory computer-readable storage media of claim 16, the operations further comprising:

in case that the predefined data type is received after the communication connection with the first external electronic device is made, based on a first communication channel, making the communication connection with the first external electronic device, based on a second communication channel; and transmitting a BLE advertisement packet to make the communication connection with the first external electronic device through the second communication channel, wherein the predefined data type is data making a request for transmitting the second exercise data to the first external electronic device or data making a request for establishing the second communication channel by the electronic device, wherein the first communication channel is a Bluetooth communication channel, and wherein the second communication channel is a Bluetooth low energy (BLE) communication channel.

18. The one or more non-transitory computer-readable storage media of claim 16, the operations further comprising:

determining whether there is a control command; and controlling an operation of the electronic device according to the control command or transmitting the control command to the first external electronic device.

19. The one or more non-transitory computer-readable storage media of claim 16, the operations further comprising:

performing control to a communication connection with the second external electronic device; and in case that a predefined data type is received from the second external electronic device, making the communication connection with the first external electronic device.

20. The one or more non-transitory computer-readable storage media of claim 16, the operations further comprising:

in case that a control command for a request for stopping the second operation mode is generated, stopping the communication connection and synchronizing exercise data and/or exercise summary data with the first external electronic device, the second external electronic device, or a server.

* * * * *